United States Patent [19]

Beckman

[11] Patent Number: 5,507,848

[45] Date of Patent: Apr. 16, 1996

[54] POLYMERS CAPABLE OF REVERSIBLY COMPLEXING ACID GASES AND A METHOD OF USING THE SAME

[76] Inventor: Eric J. Beckman, 417 Willow Pl., Edgewood, Pa. 15218

[21] Appl. No.: 30,995

[22] Filed: Mar. 12, 1993

Related U.S. Application Data

[63] Continuation-in-part of Ser. No. 28,373, Mar. 9, 1993.

[51] Int. Cl.$^6$ ..................................................... B01D 19/00
[52] U.S. Cl. ................................. 55/522; 55/524; 55/528; 525/332.2
[58] Field of Search ............................ 55/522, 524, 528; 525/332.2

[56] References Cited

U.S. PATENT DOCUMENTS 4,810,266  3/1989  Zinneu et al. .............................. 55/68

*Primary Examiner*—Bernard Lipman

[57] ABSTRACT

Aminated polymers capable of reversibly complexing carbon dioxide and other acid gases including $CO_2$, $SO_2$, $NO_x$ and $H_2S$, a method of using such polymers and an operational unit including such polymers are disclosed. The polymers incorporate amine group which reversibly complex acid gases. Such polymers provide a significant advantages over presently used sorbents used to remove acid gas.

11 Claims, 39 Drawing Sheets

OR

Chemical Shift (ppm)

Chemical Shift (ppm)

POLYMERS CAPABLE OF REVERSIBLY COMPLEXING ACID GASES AND A METHOD OF USING THE SAME

This is a continuation-in-part of copending application Ser. No. 08/028,373, filed on Mar. 9, 1993.

FIELD OF THE INVENTION

The present invention is related to polymers capable of reversibly complexing acid gases and to a method of using such polymers as acid gas sorbents, and especially to environmentally preferred, aminated polymers that are capable of reversibly complexing acid gases including $CO_2$, $SO_2$, $NO_x$ and $H_2S$ and to a method and operational unit for using such polymers.

BACKGROUND OF THE INVENTION

A significant portion of the domestic foamed polystyrene industry is threatened by environmental problems associated with production and use of expanded, or foamed polystyrene. Foamed (also known as "expanded" or "cellular") polystyrene is produced via physical blending of "blowing agents with the polymer matrix, followed by heat treatment to initiate foaming. Blowing agents can be sub-divided in to two general classes: (1) small molecules which thermally decompose to a gas (predominantly nitrogen) which initiates foaming, plus other volatile fragments; and (2) volatile liquids which are absorbed into the polymer, and which subsequently foam the polymer upon heating simply via vaporization. Examples of the first class of blowing agents include azo compounds (nitrogen producing) and calcium carbonate ($CO_2$-producing). Examples of the second type of blowing agent include Freons, pentane, air, nitrogen, and carbon dioxide.

The cells formed in the polymer during foaming remain filled with vapor characteristic of the blowing agent used. Given the large volume of foam produced each year, diffusion of vapor into the atmosphere during the foamed product's lifetime can cause significant environmental problems. Further, refoaming of recycled foamed polystyrene entails production and use of additional blowing agent which is both expensive and increasingly environmentally unacceptable.

Conventional foamed thermoplastics are produced via two distinct processes. In the first process, blowing agent is added either just prior to, or during extrusion of the polymer. High pressure within the extruder maintains a homogeneous mixture of blowing agent gas and polymer. Foaming commences with the reduction of pressure upon the polymer exiting the extruder. In the second process, blowing agent is added to polymer beads, which are then stored and shipped to a molder. Upon heating in a mold, the beads expand because of the action of the blowing agent, producing a molded, foamed article such as the drinking cups and trays used in many food-service applications.

Until recently, the preferred blowing agent for use in polystyrene beads was a Freon (chlorofluorocarbon) material or mixture. Freons were preferred because of their low toxicities, low flammabilities, and low boiling points. However, the publicity surrounding the effect of Freons on the atmospheric ozone layer, followed swiftly by the Montreal protocols, prompted the plastic industry to replace Freons in expanded polystyrene by a volatile alkane, usually pentane. Because pentane is not a "natural" material (it is refined from petroleum) and is also a "greenhouse gas", concern has arisen over the climactic effects of significant amounts of pentane released into the atmosphere as a result of foamed polystyrene production. The plastics industry has thus been searching for environmentally acceptable replacements for pentane in foamed polystyrene.

From an environmental perspective, $CO_2$ is unquestionably an attractive thermoplastic blowing agent in that it can be readily recovered from the atmosphere, it is non-flammable, and it exhibits relatively low toxicity. Indeed, experience has shown that carbon dioxide can produce a cellular morphology when used as a blowing agent for polystyrene. U.S. Pat. No. 4,925,606, German Patent No. 3,829,630, U.S. Pat. No. 4,911,869, Japanese Patent No. 63,000,330, Zwolinski, L. M., Dwyer, F. J., 42 Plast. Eng. 45 (1986) and French Patent No. 2,563,836 discuss the use of carbon dioxide as a blowing agent in extruded polystyrene foam.

As indicated by Wissinger, R. G. and Paulairis, M. E., 25 J. Polym. Sci.: Part B: Polym. Phys. 2497 (1987) polystyrene will indeed absorb significant amounts of $CO_2$ under pressure. Because of the relatively low solubility of $CO_2$ in polystyrene and its high volatility, however, most of the gas rapidly effuses from the polymer matrix upon reduction of the pressure. This rapid effusion prevents formation of a commercially acceptable foam. Commercial producers of extruded polystyrene foam, therefore, use either Freon, pentane or a mixture of Freon or pentane and $CO_2$ as a blowing agent.

Moreover, despite the limited success of $CO_2$ in extruded foam, either alone or in a mixture, the use of $CO_2$ in foamed polystyrene beads is not presently possible. Quite clearly, unlike pentane and freon, the equilibrium concentration of $CO_2$ in polystyrene at atmospheric pressure is too low to support subsequent foaming of polystyrene beads or secondary foaming of slabstock during thermoforming.

In an art unrelated to foamable polymers, it is known that low molecular weight primary and secondary amines will react with $CO_2$ to form carbamic "zwitterions," providing the amines are sufficiently basic in character. These reactions have been discussed by Javier, F.J.B.G., Ing. Quim. 317 (Oct. 1989); Javier, F.J.B.G., Ing. Quim., 215 (Nov. 1989); Danckwerts, P. V., Sharms, M. M., 10 Chem. Eng. 244 (1966); Laddha, S. S., Dankwefts, P. V. 37 Chem. Eng. Sci. 475 (1982); Versteeg, G. F., an Swaaij, W.P.M., 43 Chem. Eng. Sci. 573 (1988) and Danckwerts, P. V., 34 Chem Eng. Sci 443 (1979). It is also known that these zwitterions are stable at ambient conditions but will revert to carbon dioxide and free amine at higher temperatures. U.S. Pat. No. 3,029,227; U.S. Pat. No. 3,423,345; U.S. Pat. No. 4,102,801. $CO_2$/amine reactions have previously been used to construct thermally reversible protecting groups for reactive epoxy systems and to selectively remove carbon dioxide and acid gases from gas streams.

General public awareness concerning the protection of the environment has created the need to devise environmentally friendly and energy-efficient technology for the clean-up of industrial gas streams. Weakly acidic gases such as $CO_2$, $SO_2$, $NO_x$ and $H_2S$ discharged directly into the atmosphere have been suggested to contribute to the formation of acid rain and so-called greenhouse warming. In addition, acidic gases such as $CO_2$, $SO_2$ etc. can act as poisons for various catalyst systems and thus must be removed from certain process streams. Traditional methods for acid gas removal include:

1. Aqueous solutions of amines/alkanolamines for scrubbing $CO_2$ as discussed above. The main disadvantages of these sorbent systems are: Slow reaction rates, energy intensive regeneration step (must heat large volumes of water), side reactions which degrade the amines, and loss of amines by evaporation.

2. Limestone for the removal of $SO_2$; the major environmental drawback associated with this process is the generation of large quantities of sludge.

3. High temperature mineral sorbents for the removal of $SO_2$ and NO. These materials are however not designed to also remove $CO_2$ selectively.

It is an object of this invention to provide environmentally safe, foamed polymers and especially to provide a polymeric matrix incorporating pendant amine groups capable of reversibly complexing $CO_2$, thereby providing an environmentally safe method of producing an expanded or foamed polymer.

It is also an object of this invention to provide polymeric matrices incorporating amine groups useful generally as thermally reversible sorbents for acid gases.

SUMMARY OF THE INVENTION

Accordingly, the present invention provides polymers capable of reversibly complexing carbon dioxide and other acid gases including $SO_2$, $H_2S$ and $NO_x$.

In a preferred embodiment, an expandable (foamable) thermoplastic material is provided that is inherently recyclable and emits no pentane, freon or other environmentally hazardous gas to the atmosphere, either during or after the foaming process. The present invention also provides a method of producing such a thermoplastic material.

It has been discovered that the ability of amines to complex or react with carbon dioxide is substantially unaffected by incorporation of such amines into a polymeric matrix. Indeed, the thermal stability of amine-$CO_2$ adducts appears to increase upon incorporation of the amine into the polymer matrix. For example, tertiary amine-functional polymers bind $CO_2$ whereas a low molecular weight tertiary amine does not.

Generally, the aminated or amine-functional polymers react with $CO_2$ to form carbamic zwitterions (equation 1 below) and/or ion/counterion pairs (equation 2 below) of the following general formulae:

(1)

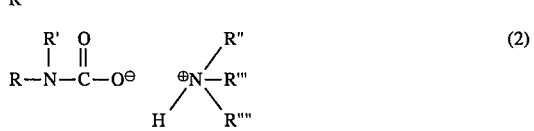
(2)

Wherein R is a polymer preferably having a weight average molecular weight greater than approximately 25,000. Preferably R' also comprise an amino group capable of complexing with $CO_2$ to form a carbimic zwitterion and/or an ion/counterion pair.

Aminated polymers with softening or glass transition temperatures ($T_g$'s) in a range coinciding with the range of temperatures over which $CO_2$ reaction products thermally dissociate will form a foamed polymer via thermal dissociation of the $CO_2$. Upon heating the material above a predetermined temperature, the polymer softens and the zwitterions and/or ion/counterion pairs revert to "free" amine and $CO_2$, thereby inducing foaming.

Thus, polymers containing amine groups (preferably pendant primary or secondary amine groups) are first synthesized. Any amine group capable of reversibly complexing carbon dioxide can be used. Preferably the amine groups have a $pK_a$ greater than approximately 8.0. The pendant amine groups are preferably di- or triamines. Suitable amine groups include but are not limited to piperazine (PIP), 1-methylpiperazine (1-MPIP), cis and trans 1,4-diaminocyclohexane (1,4-DAC), diethylenetriamine (DETA), TETA, hexamethylene diamine, ethylenediamine (EDA), N-MEDA, N,N-DMEDA, N,N'-DMEDA, N,N,N'-TMEDA, diamine-p-menthane adamantanediamine, N,N'-diethyl-2-butene- 1,4-diamine, N-cyclohexyl-1,3-propanediamine, and 3,3'-diamino-N-methyldipropylamine. Most preferably, the pendant amine groups are diamines.

Any polymer comprising pendant amine groups which can be thermally softened and foamed is suitable in that $CO_2$ binding or complexing is accomplished by the pendant amine groups. The polymer backbone functions to anchor the $CO_2$ complexing pendant amine groups and does not hinder the complexing or binding and subsequent debonding of $CO_2$.

To provide polymers with appropriate physical properties and $T_g$'s for foaming, the polymers preferably have a weight average molecular weight ($M_w$) above approximately 25,000. Preferably $M_w$ is in the range of approximately 25,000 to 1,000,000. More preferably, the polymers have a weight average molecular weight in the range of approximately 75,000 to 1,000,000. Most preferably $M_w$ is in the range of approximately 100,000 to 1,000,000.

The present aminated polymers preferably comprise sufficient amine groups to complex sufficient carbon dioxide to effect a desired degree of foaming. Preferably, the polymers comprise sufficient amine group to complex between approximately 1–33 weight percent carbon dioxide based upon the weight of the uncomplexed aminated polymer. More preferably the polymers comprise sufficient amine groups to complex between approximately 4–20 weight percent carbon dioxide. Most preferably the polymers comprise sufficient amine groups to complex between approximately 5–20 weight percent carbon dioxide.

Preferably, a thermoplastic material is produced by the copolymerization of vinyl monomers which can react with carbon dioxide to form carbamic zwitterions and/or ion/counterion pairs. More specifically, monomers which can be copolymerized with styrene, or for that matter, any vinyl monomer, and which can reversibly complex carbon dioxide are synthesized. Such vinyl polymers are relatively easily synthesized in the laboratory. Moreover, unaminated vinyl polymers such as polystyrene presently account for a large percentage of the foamed polymer market.

While stable under ambient conditions, the $CO_2$ reaction products of the polymers thermally disassociate to form free $CO_2$ at temperatures above approximately 60°–70° C.

Aminated polymers and copolymers can be exposed to $CO_2$ either in bulk or in solution. Aminated polymers are found to react readily with $CO_2$ under a variety of conditions including absorption of $CO_2$ from the air at ambient conditions. The exposure to $CO_2$ results first in swelling, followed quickly by reaction and significant complexing of the $CO_2$ into the material, preferably in the form of zwitterions. Unlike the case of simple swelling of polystyrene by $CO_2$, the stability of these zwitterions at atmospheric pressure and temperature prevents destabilization of the material upon a reduction in pressure to ambient conditions.

Thermal dissociation of the adsorbed $CO_2$ occurs in a clean fashion, resulting in the regeneration of the original aminated copolymer. The binding capacity of the pendant amine groups increases in the order primary > secondary > tertiary following increases in relative basicity.

Because the reaction of an amine and $CO_2$ to produce a carbamic zwitterion and/or an ion/counterion pair is a reversible reaction, and because the amines are locked into the polymer backbone, the present polymers can be reverted to their expandable form simply by collection, washing, granulating, and re-exposure to high pressure $CO_2$.

Further, because the carbon dioxide can be isolated from the atmosphere, the product will be recycling the gas continually, rather than generating new gases. Reversion to the expanded polymer closes the recycling loop for this material, a major goal of plastics recyclers.

Still further the ability in the present invention to accurately vary the amine content of the aminated polymers and thereby the amount of $CO_2$ complexed enables substantial control over foaming and thereby over the physical properties of the foamed product.

Moreover, microporous as well as linear, non-porous amine-functional polymers and copolymers are effective, thermally-reversible sorbents for acid gases including $CO_2$, $NO_x$, $SO_2$ and $H_2S$. Regenerable polymeric sorbents for acidic gases provide several advantages in industrial applications because they are environmentally benign, relatively stable, easy to handle (low density), recyclable, and can be regenerated under mild reaction conditions. In addition, the ability to prepare highly porous, crosslinked materials maximizes both the rate and ultimate capacity for binding, significantly enhancing the potential of these materials for industrial applications.

The reaction products resulting from the reaction of carbon dioxide with an aminated polymer have been set forth above. The reaction product of sulfur dioxide and an aminated polymer has the following general formula which can be referred to as a sulfamic zwitterion:

(3)

The reaction product of nitric oxide and an aminated polymer is believed to have the following general formula which can be referred to as a nonoate:

(4)

The reaction product of hydrogen sulfide and an aminated polymer is believed to have the following general formula which can be referred to as an ion/counterion pair:

(5)

In aminated polymeric each of the above equations R is a polymer. R may be a linear aminated polymer as described above in connection with the reactive complexing of $CO_2$. Preferably, R is an aminated crosslinked, microporous polymer. Once again, the amine groups of the aminated polymer are preferably pendant amine groups. As the polymer backbone acts essentially to anchor the pendant amine groups and does not hinder the binding and subsequent debonding of the acid gas, substantially any polymer backbone is suitable. Generally, the preferred choices of amine groups are as described above in connection with the reactive complexing of $CO_2$ to form foamed polymers.

These materials may also find potential applications in facilitated transport membrane technology.

DETAILED DESCRIPTION OF THE INVENTION

A. Complexing of $CO_2$ Using Linear Aminated Polymers and Production of Foamed Polymers.

Results from studies of $CO_2$/amine reactions using free amine indicate: (1) the reactivity of amines towards $CO_2$ appears to increase as the basicity of the amine increases (p$K_b$ decreases) and (2) varying the stoichiometry of the reaction can lead to structurally different products. Regarding the latter point, a 2:1 amine/$CO_2$ ratio is generally thought to produce the ion/counterion product:

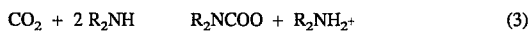

$$CO_2 + 2 R_2NH \quad R_2NCOO^- + R_2NH_2^+ \quad (3)$$

whereas an equimolar ratio is predicted to generate the zwitterion:

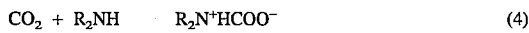

$$CO_2 + R_2NH \quad R_2N^+HCOO^- \quad (4)$$

It is preferable to complex at least one $CO_2$ molecule per amine group in the present polymers, thereby maximizing the number of $CO_2$ molecules available for foaming. It is, therefore, preferable to form the zwitterion.

1. Monomer and Copolymer Synthetic Schemes

Figure 1:
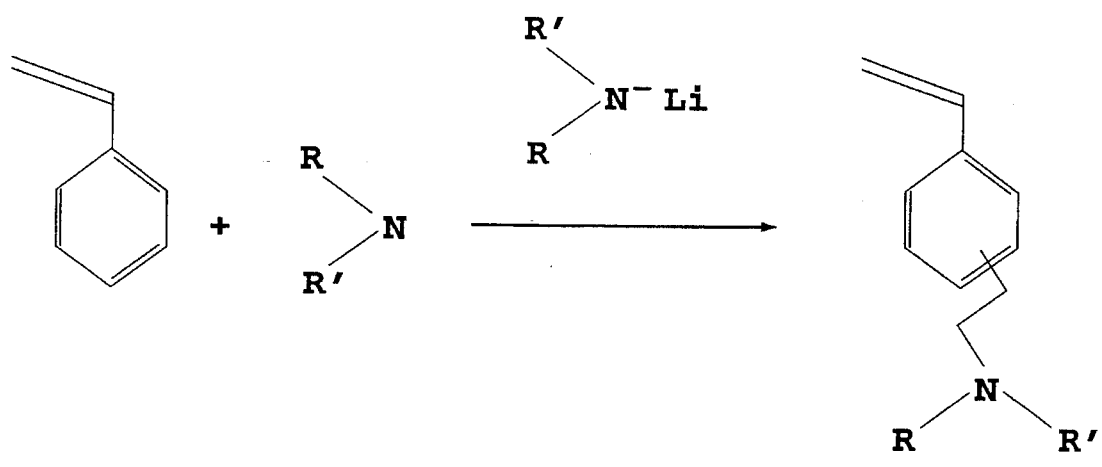
FIG. 1 is an illustration of a Scheme 1 polymer synthesis under the present invention.
Figure 1:
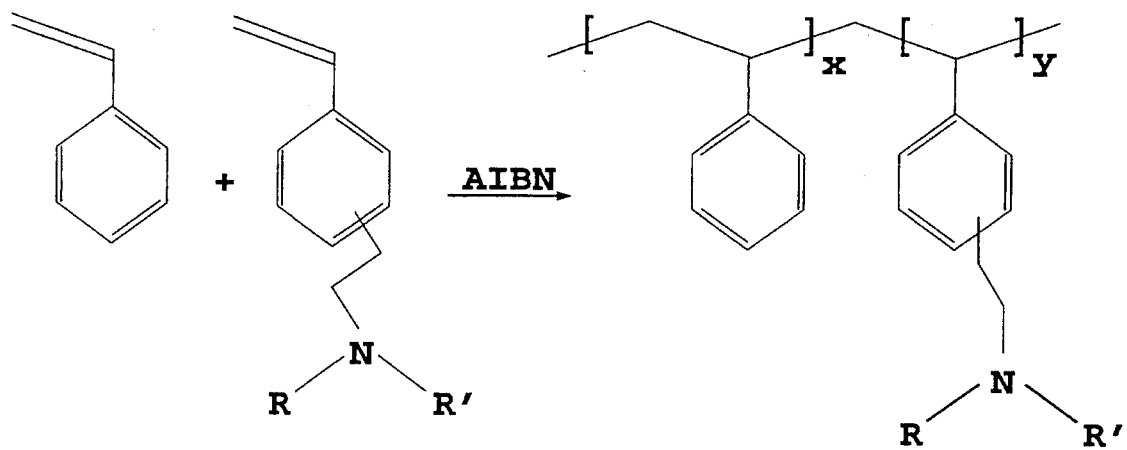

Amino-bearing functional groups can be incorporated into a polymer through several synthetic schemes. As depicted in Scheme I of FIG. 1, such functional groups can be incorporated via a copolymerization of a vinyl monomer (e.g., styrene) and a functionalized vinyl comonomer (e.g., functionalized styrene). The functionalized comonomer(s) are readily prepared either by addition of a primary or secondary amine to vinylbenzylchloride (VBC or chloromethyl styrene) (preferably in the presence of a phase transfer catalyst) or by addition of an amine/lithiated amine mixture to divinylbenzene. A drawback to the preparation of functionalized comonomer(s) using divinylbenzene is the difficulty in obtaining sufficiently pure divinylbenzene. Diamines and triamines are preferably used to ensure that an unreacted, pendant amine group remains to complex with $CO_2$. Monoamines have previously reacted with choromethyl styrene via a nucleophelic substitution of chlorine by N'Guyen, T. D., et al., 19 Polymer 423 (1978) and Tsuruta, T., et al., 177 Chem. 3255 (1976).

Figure 2:
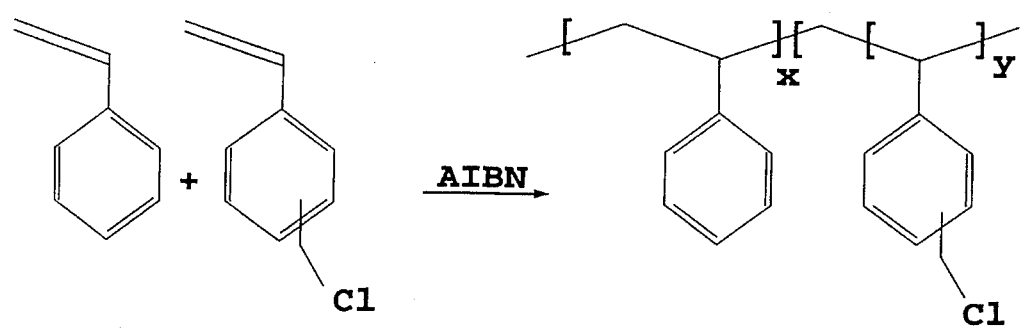
FIG. 2 is an illustration of a Scheme 2 polymer synthesis under the present invention.
Figure 2:
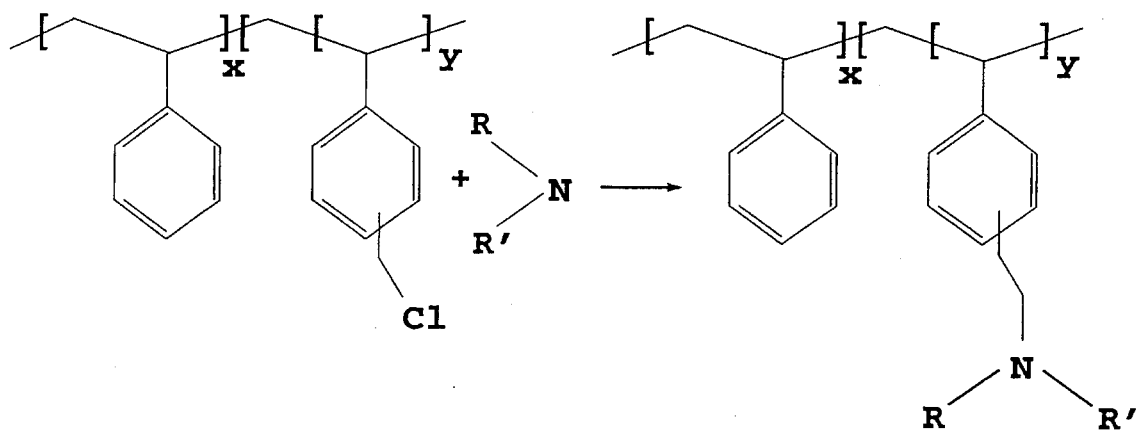

Amino-bearing functional groups may also be incorporated by functionalization of a previously prepared S-VBC copolymer (Scheme II as depicted in FIG. 2). N'Guyen and coworkers have shown that monoamines can be incorporated into a S-VBC copolymer. The latter procedure was claimed to ultimately produce a more thermally-stable polymer than that derived from chloromethyl styrene. It has been discovered that amino-functionalized styrene polymers can be readily prepared via the reaction of a poly styrene-co-vinylbenzylchloride or S-VBC with an excess or di- or tri-amine in solution.

In a typical synthetic procedure under Scheme II, styrene and VBC monomers supplied by Aldrich Chemical Company, Inc. are preferably washed with dilute NaOH to remove inhibitor, then vacuum-distilled in the presence of a drying agent and stabilizer. The S-VBC copolymer may be prepared via solution polymerization in toluene under $N_2$. The reaction is allowed to proceed for predetermined period of time, after which time the copolymer is precipitated in a large excess of methanol, washed, then vacuum dried. Amino-functionalized styrene copolymers may be prepared by adding a solution of poly (styrene-co-VBC or S-VBC) in DMF preferably to an excess of diamine or triamine. Excess diamine and/or triamine is preferably used to minimize crosslinking. The reaction is allowed to proceed to completion at room temperature. The product is precipitated in dilute aqueous NaOH, washed, then vacuum dried.

Figure 3:
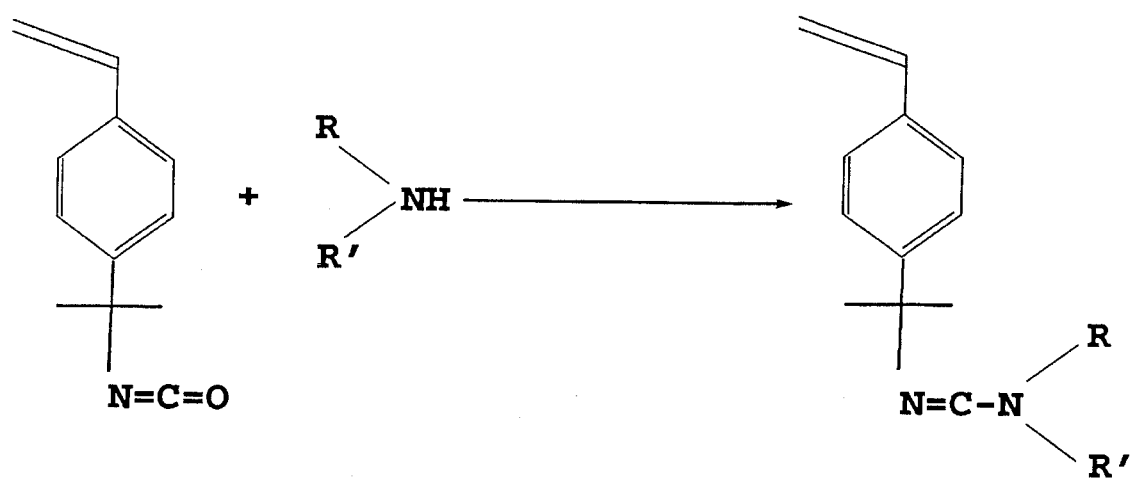
FIG. 3 is an illustration of two scheme 3 polymer syntheses under the present invention.
Figure 3:
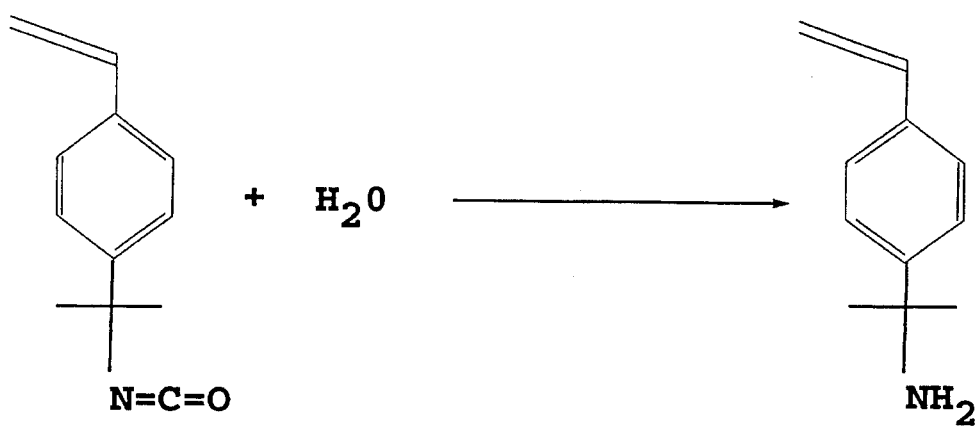

Two additional synthetic schemes, referred to generally as Scheme III, for producing amino-functionalized copolymers are shown in FIGS. 3A and 3B. In FIGS. 3A and 3B, a functionalized comonomer is prepared by the reaction of 1-(-isocyanoto-1-methylethyl)- 3-(1-methylethenyl)benzene (TMI™) provided by American Cyanamid Company with a primary or secondary amine or with water. The functionalized comohomer may then be copolymerized with styrene or another vinyl monomer.

Also consistent with Scheme III, a copolymer of TMI and styrene or another vinyl monomer can first be synthesized. The resultant copolymer can then be functionalized in a reaction similar to those shown in FIGS. 3A and 3B. In the case of copolymerization of styrene and TMI, the styrene monomer is first washed to remove the inhibitor. TMI is obtained inhibitor-free. The TMI and styrene are copolymerized in toluene at approximately 70° C. under nitrogen using a free radical initiator such as azo bis(isobutyronitrile) (AIBN). After approximately 36 hours, the copolymer is withdrawn for analysis and functionalization. The copolymer/toluene solution is poured into a toluene solution containing an excess of di- or triamine. The mixture is then allowed to react at approximately 50° C. overnight. Subsequently, the polymer is precipitated by adding a large volume of the non-solvent methanol. Following precipitation, the copolymer is washed with methanol and acetone, and then vacuum dried.

Figure 4:
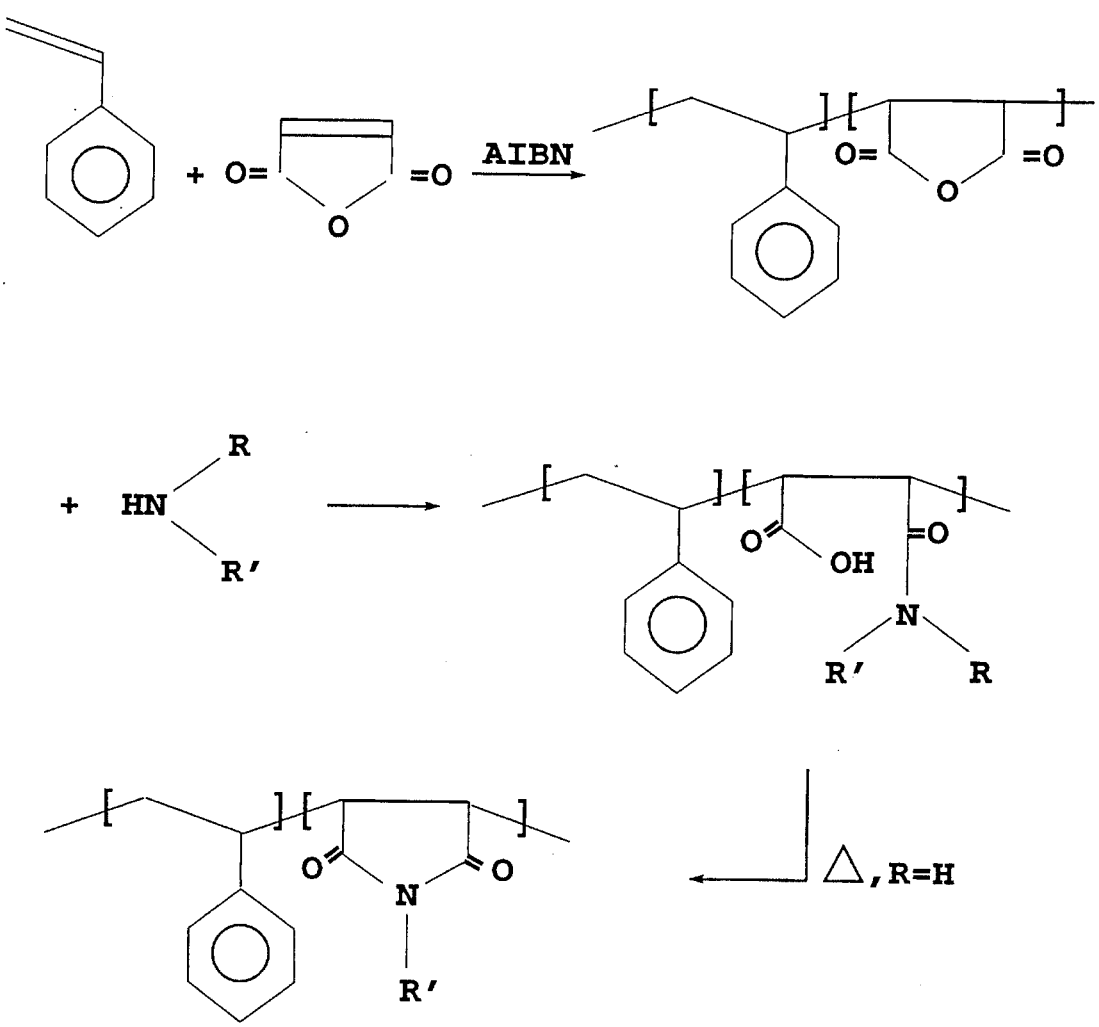
FIG. 4 is an illustration of a Scheme 4 polymer synthesis.

In Scheme IV, depicted in FIG. 4, maleic anhydride is copolymerized with a vinyl monomer in the presence of a free radical initiator such as (AIBN). The copolymer is then functionalized by the addition of a primary or secondary amine.

Finally, it has been demonstrated that certain amino acids, particularly lysine and arginine, effectively complex carbon dioxide. These results suggest the possibility of generation of amino-acid functionalized synthetic polymers which reversibly complex $CO_2$, or the intriguing potential for the design of proteins or polysaccharides which can be used as recyclable and/or degradable, expandable materials.

2. Examples of Copolymer Synthesis

Example A

In a synthetic procedure under Scheme I, an amine functionalized vinyl comonomer was produced by reaction of vinylbenzylchloride (VBC) with ethylenediamine (EDA) in the presence of PolyDMAP™, a polymer-bound dialkylaminopyridine acylation catalyst (Reilly Industries, Inc.). This synthesis consisted of adding dropwise a solution of 10.7 g (70.2 mmols) VBC in 20 ml of dry toluene into a stirred mixture of 21 g (350 mmols) EDA, 5 ml of toluene and 500 mg of polyDMAP. After 30 minutes, the solvent and excess EDA were removed under vacuum. The aminated comonomer was separated from the catalyst by filtration; the yield was approximately 62%. The aminated copolymer was subsequently obtained via a solution free-radical copolymerization. In a typical reaction, 13.6 g (131 mmols) of styrene, 4.9 g (28 mmols) comonomer and 18 mg of AIBN were added to 40 ml of toluene under nitrogen at room temperature. The mixture was stirred at 68° C. for six hours after which the contents were poured into a large volume (300 ml) of methanol to coagulate the polymer. After subsequent filtration and washing with methanol, the product was dried for 24 hours under vacuum.

Example B

In a synthesis under the procedure of Scheme II, S-VBC copolymers were prepared via AIBN-initiated solution copolymerization in toluene at 68° C. Several amines, including piperazine (PIP), 1-methylpiperazine (1-MPIP), cis and trans 1,4-diaminocyclohexane (1,4-DAC), diethylenetriamine (DETA) and ethylenediamine (EDA) have been reacted with styrene-VBC copolymer (1 g, VBC/Styrene= 1:5) in toluene (80 ml). The copolymer solution is dripped slowly into a large excess of amine in 100 ml of toluene. In the presence of an acylation catalyst, the mixture was stirred under nitrogen for several days at 30° C., after which the solvent is removed under vacuum. The product was washed to remove excess amine and dried under vacuum.

Example C

Figure 5:
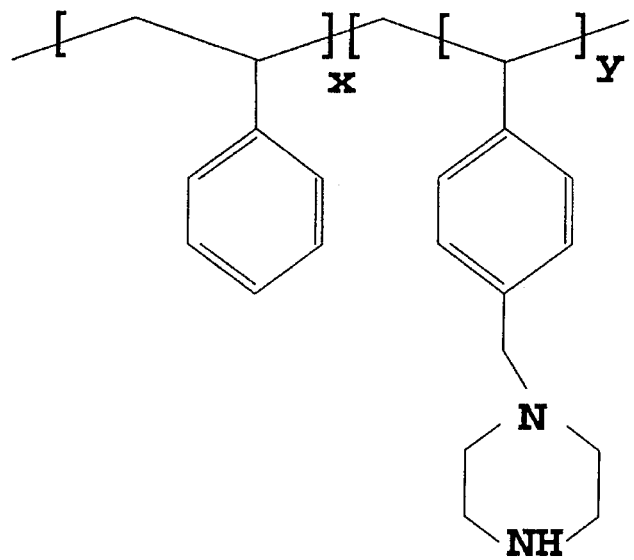
FIG. 5 is an illustration of a copolymer of styrene and piperazine-functionalized styrene.

In another synthesis under Scheme II, a copolymer of styrene and piperazine-functionalized styrene shown in FIG. 5 (monomer/comonomer molar ratio=5:1) was successfully synthesized. This copolymer exhibited a glass transition temperature of approximately 120° C. by DSC, while TGA showed no weight loss up to 300° C. As in the case of the model free amine compounds, the reactivity of the copolymer towards $CO_2$ was gauged by dissolving a sample in chloroform and sparging the solution with $CO_2$. Exposure of the copolymer to $CO_2$ quickly led to formation of a chloroform-insoluble product. A TGA analysis of this $CO_2$ reaction product showed weight loss commencing at leveled out at 8% at approx. 140° C. (scan rate=20° C./min.). Examination of the TGA sampling following cooling clearly showed a cellular structure. Curiously, a weight loss of 8% suggests that this copolymer complexes more than one $CO_2$ molecule per amine group, given that the copolymer showed no signs of degradation following the TGA scan.

Example D

Figure 6:
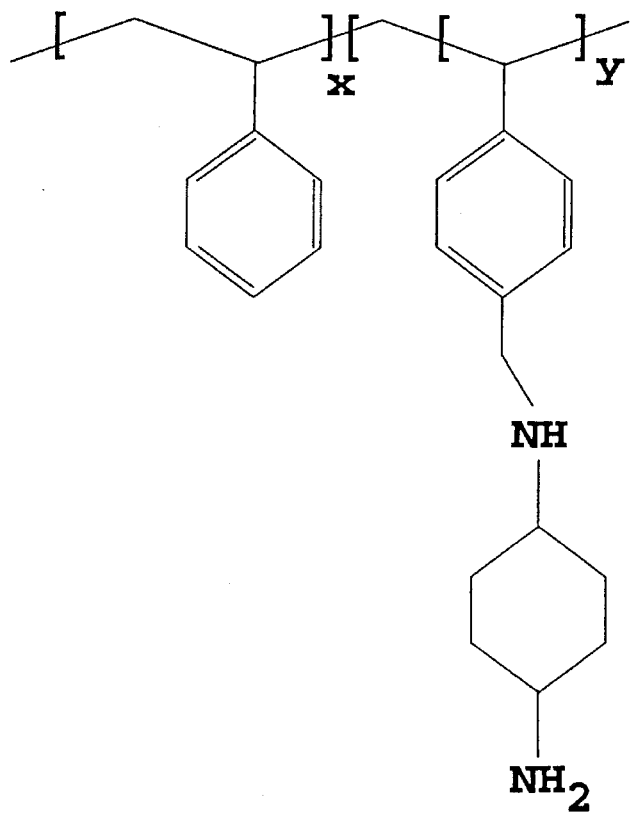
FIG. 6 is an illustration of a copolymer of styrene and hexamethylene diamine.

In another synthesis under Scheme II, a copolymer of styrene and hexamethylene diamine shown in FIG. 6 (monomer/comonomer molar ratio=4:1) has been successfully synthesized. This copolymer exhibited a glass transition temperature of approximately 105° C. by DSC. The polymer was shown to be reversible to its carbon dioxide complexed form by re-exposure to high pressure $CO_2$.

Example E

In still another synthesis under scheme II, several copolymers functionalized with EDA variants were synthesized. Styrene and VBC (70% meta, 30% para) from Aldrich were washed separately with a 0.5% aqueous sodium hydroxide solution to remove the polymerization inhibitors. This process was repeated a minimum of three times. The monomers were then rinsed with distilled water at least six times to substantially eliminate all traces of the sodium hydroxide. Molecular sieves were added to the monomers which were then stored for a minimum of 24 hours in a refrigerator at 4° C. The monomers were then distilled under vacuum prior to polymerization.

The precursor copolymers were made in a toluene (Fisher) solution via free radical polymerization initiated by azo-bisisobutyronitrile (AIBN) (Aldrich). Typically, a 3000 ml, three-neck round bottom flask mounted with a reflux condenser was flushed with nitrogen for 1 hr. The reactor was then charged with 100 ml toluene; 76.6 g (736.5 mmol) styrene; 22.5 g (147.5 mmol) VBC and a solution of 105 mg of AIBN in 10 ml of toluene. The mixture was stirred at room temperature for 30 min while bubbling nitrogen into the reactants. The nitrogen feed was then shut off and the reactor was immersed in an oil bath preheated to 105° C. and the contents stirred overnight. The copolymer was recovered by pouring the solution into a large volume (100 ml) of methanol (Fisher). The precipitate was separated by filtration, redissolved in chloroform (Fisher) and coagulated again in methanol. The product was finally washed several times with small volumes (50 ml) of methanol and dried under vacuum.

The alkylation reactions to produce aminated copolymers were carried out in a toluene solution at 30° C. under nitrogen atmosphere in the presence of polyDMAP. In a typical experiment, 5.259 g of an S-VBC copolymer (with a 30% VBC molar content) were dissolved in 150 ml of toluene. Meanwhile, 8.92 g (149 mmol) of EDA (Aldrich) (i.e., a large excess of EDA to VBC) and 20 ml of tolluene were placed in a 3000 ml, three neck round bottom flask previously flushed with nitrogen as indicated in the preceding paragraph. The copolymer solution was added dropwise into the amine solution while stirring vigorously. The mixture was stirred for 3 days, heated to 90° C. for 4 hrs. then poured into 1500 ml of a 5% aqueous sodium hydroxide solution and stirred at room temperature overnight. To recover the copolymer, the solvent was evaporated under vacuum and the water insoluble fraction of the amino copolymer was separated by filtration, washed thoroughly with distilled water then dried under vacuum. Preparation of materials functionalized with other ethylenediamine variants was also accomplished following these procedures.

3. Copolymer Characterization a. Composition

All polymers were characterized using infrared (IR) and $^{13}C$ NMR. Infra-red spectra were obtained on a Matson FT-IR as KBr pellets. Elemental analysis was performed by Galbraith Labs, Knoxville, Tenn.

Figure 7:
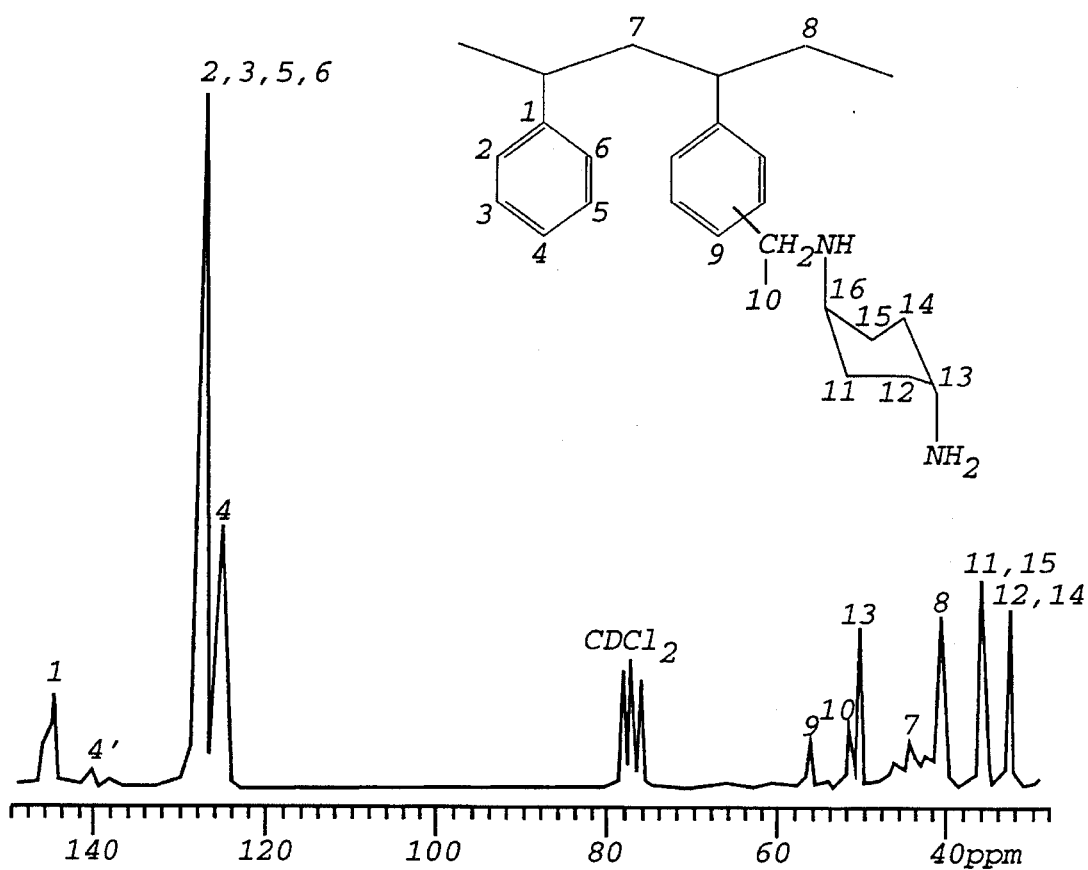
FIG. 7 is a $^{13}C$ NMR spectrum for a copolymer functionalized with 1,4-DAC.

A sample $^{13}$C NMR spectrum obtained on a BRUCKER 300 MSL instrument using a 10 mm liquid probe and deuterochloroform as solvent is shown in FIG. 7 for the copolymer functionalized with 1,4-DAC as described in Example B. As can be seen, there are apparently no residual unreacted chloromethyl groups, consistent with elemental analysis results. Concerning the Scheme II copolymers of Example B, elemental analysis shows that the VBC/styrene ratio in the precursor copolymer is 1:5. Gel Permeation Chromotog raphy ()\) shows that the number average molecular weight ($M_n$) is approximately 75,000 and $M_w$ is approximately 128,000. Furthermore, elemental analysis of the aminated copolymers shows that nearly complete substitution the of chloromethyl group has been achieved.

The compositions of the copolymers of Example E were also determined by elemental analysis at Galbraith Laboratories; Knoxville, Tenn., and also via high resolution proton-NMR (Brucker MSL300 instrument with a 5 mm high resolution probe and deuterochloroform as a solvent). In the case of the prot on-NMR analysis, copolymer composition is calculated from the relative intensities of the chloromethyl proton signal. Molecular weight and molecular weight distribution were determined by gel permeation chromatography ()\) using a Waters 150-C instrument with tetrahydrofuran (Aldrich) as the carrier solvent. Weight average molecular weights ($M_w$) and polydispersities were found to range from 98,000 to 130,000 and 2.5 to 3.2 respectively.

The S-VBC copolymer precursors of Example E are predominantly of the random type as deduced from differential scanning calorimetry (DSC) measurements (only one transition was observed) as well as via examination of the reactivity ratios reported in the literature.

Figure 8A:
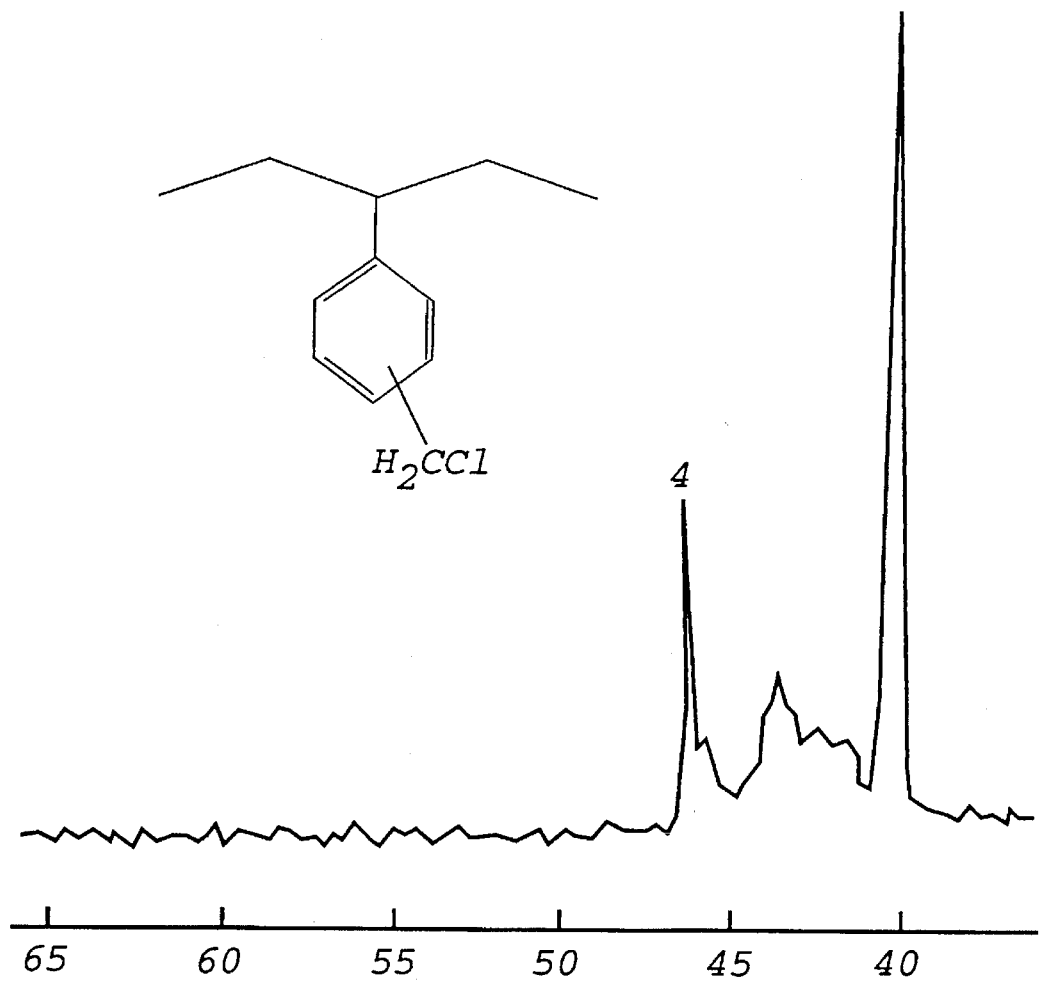
FIG. 8A is an illustration of a $^{13}C$-NMR spectrum of an S-VBC copolymer.
Figure 8B:
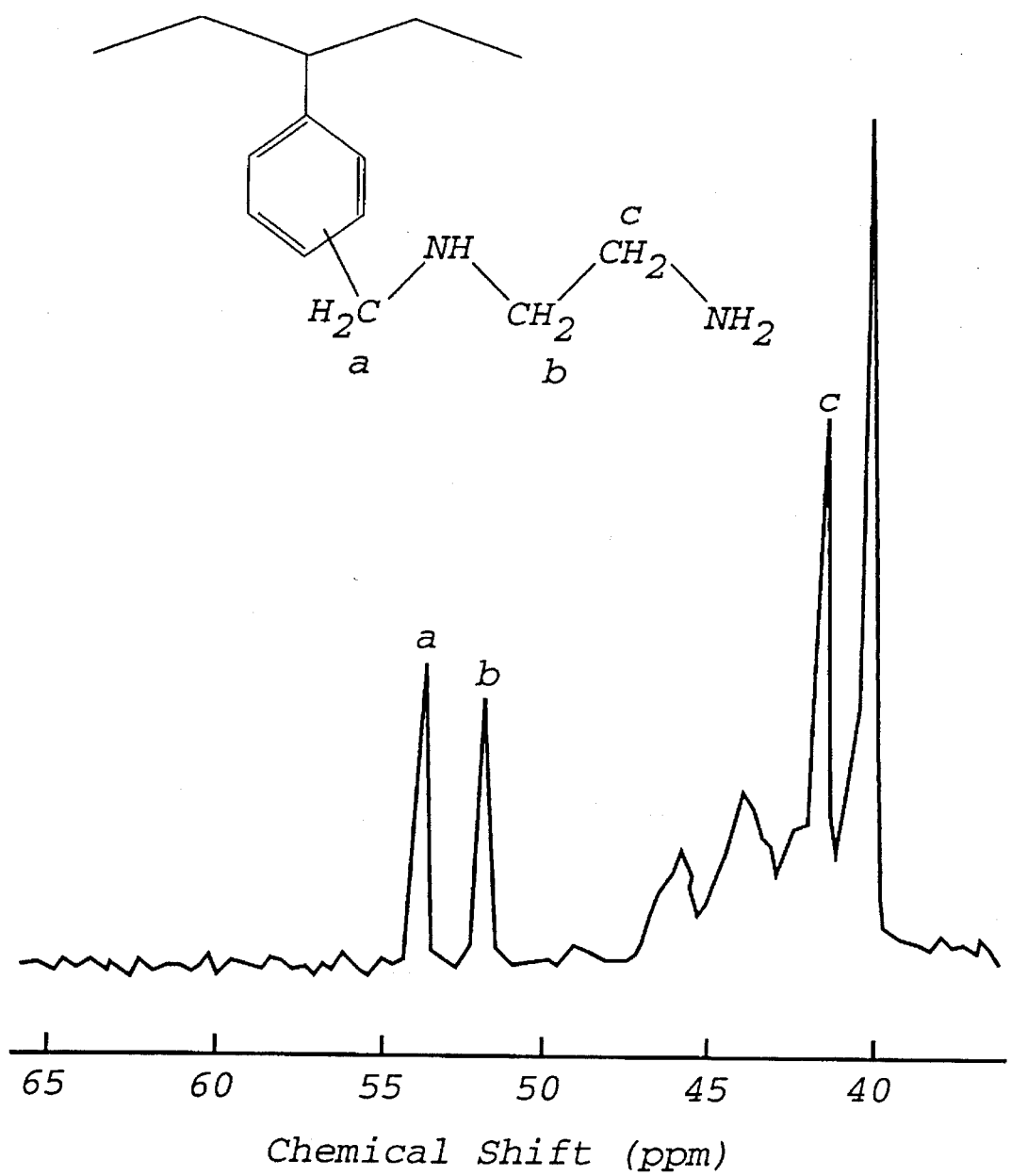
FIG. 8B is an illustration of a $^{13}C$-NMR spectrum of an EDA-functional copolymer.
Figure 9A:
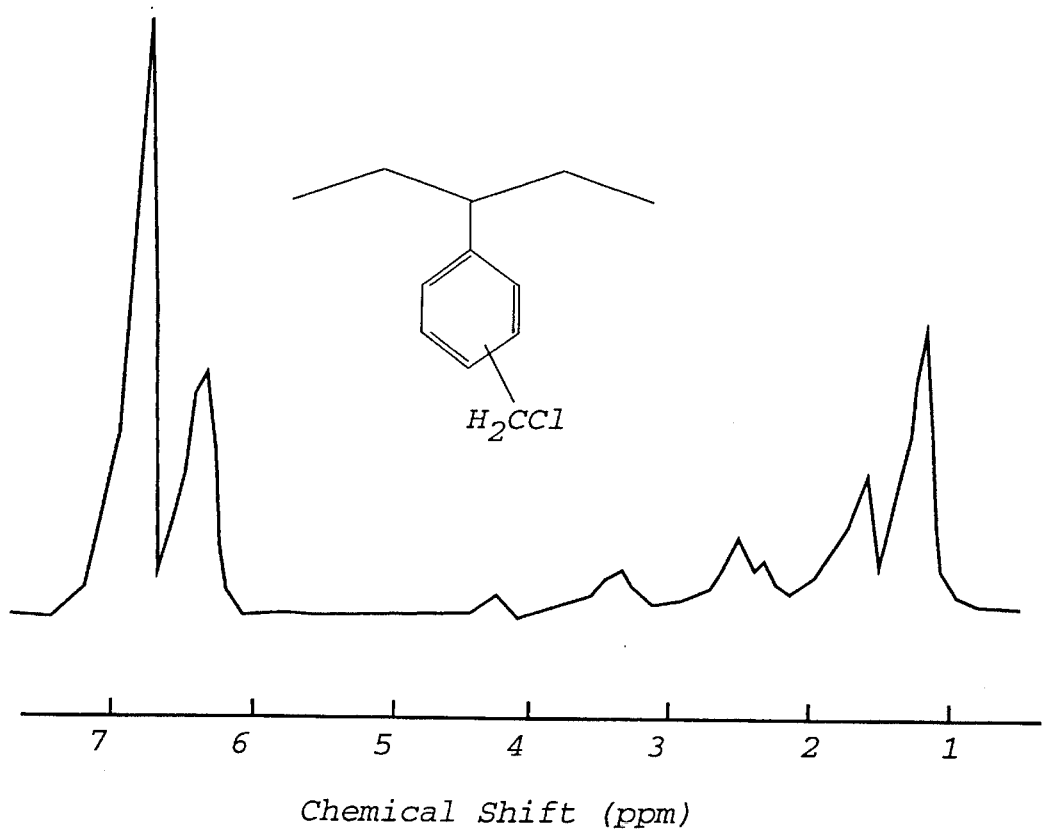
FIG. 9A is an illustration of an $^1H$-NMR spectrum of an S-VBC copolymers.
Figure 9B:
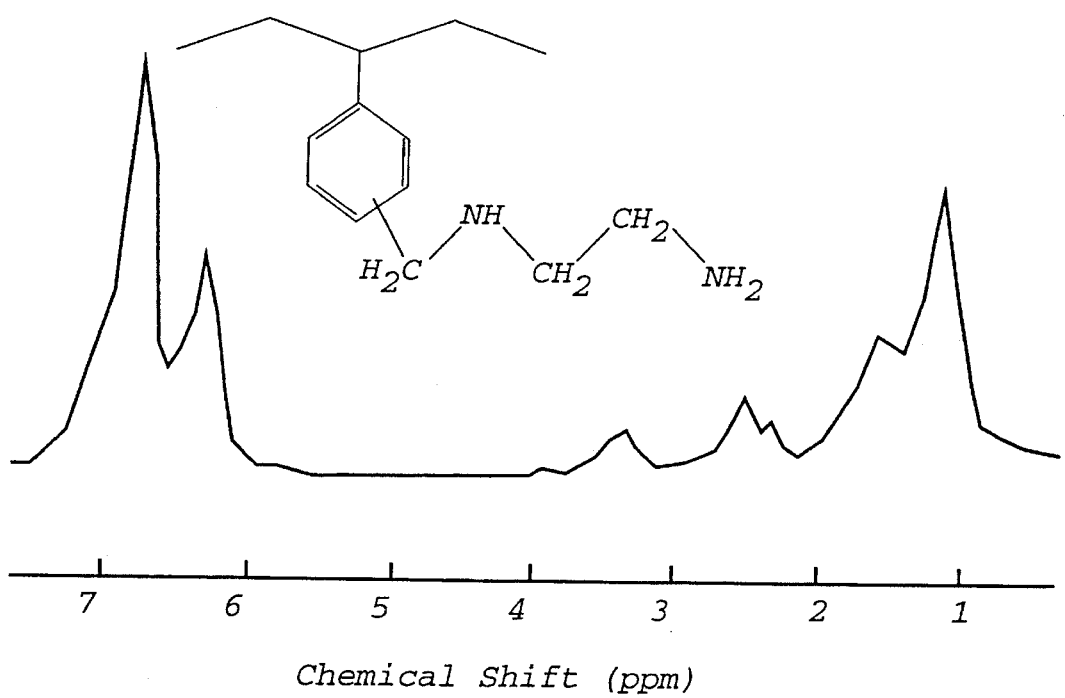
FIG. 9B is an illustration of a $^1H$-NMR spectrum of an EDA-functional copolymer.

Evidence for the formation of the amino-copolymer is provided by elemental analysis and $^{13}$C-NMR. For example, the spectra shown in FIGS. 8A and 8B indicate that the alkylation reaction is quantitative. The proton-NMR spectra reported in FIGS. 9A and 9B also support this conclusion.

b. Effect of composition upon glass transition temperture

Incorporation of significant amounts of a comonomer into polystyrene can change the glass transition temperature of the polymer, although the degree of change depends on the side-group structure and concentration. Differential Scanning Calorimetry (DSC) measurements the glass transition of the amino-functionalized copolymers of Examples A and B (derived from 1:5 VBC/styrene precursor) are set forth in Table 1 below. A range of Tg's are exhibited.

TABLE 1

| Amine Group | Tg |
|---|---|
| PIP | 123 |
| 1,3-DAC | 101 |
| EDA (Scheme I) | 83 |
| 1-MPIP | 120 |
| 1,2-DAC | 85 |
| DETA | 82 |
| Base copolymer, S – VBC = 5:1 | 103 |

Figure 10:
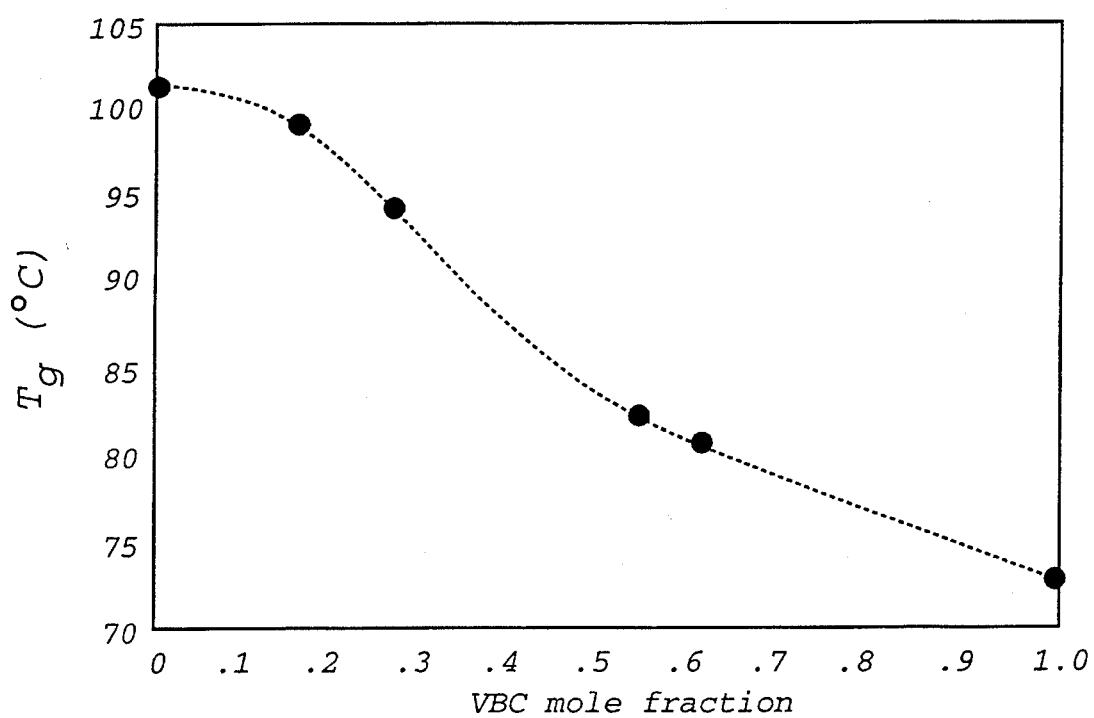
FIG. 10 is an illustration of the glass transition behavior of styrene/vinylbenzylchloride (S-VBC) copolymers as a function of VBC content.

Glass transition temperatures ($T_g$) of the copolymers of Example E were evaluated with a TA 2000 thermal analysis system, using a heating rate of 10° C./min. $T_g$'s of the copolymers were determined from second scans. The glass transition temperatures of the precursors were found to vary with copolymer composition as shown in FIG. 10.

4. Reaction of Amino-Functionalized Polymers with $CO_2$

Amine functionalized styrene-based copolymers were found to react readily with carbon dioxide, either in bulk or solution using the following methods:

1. Copolymer powder or a compression molded disk or film (13 mm in diameter) may be exposed to carbon dioxide at ambient temperature and pressure, at the vapor pressure, or at supercritical conditions.

2. The animated copolymer may be dissolved in chloroform under ambient conditions. Upon sparging with $CO_2$ a white precipitate quickly appears, indicating the formation of the polymer-bound zwitterion. The product is separated by filtration and dried under vacuum.

The aminated copolymers of Table 2 below were complexed with $CO_2$ via method 1. The stability of the $CO_2$ adduct was analyzed using thermogravimetric analysis (TGA). TGA measurements on the $CO_2$ reaction products of the aminated copolymers as set forth in Table 2 show that the onset of weight loss occurs at temperatures above 60° C. The analysis of the aminated copolymer prior to reaction with carbon dioxide revealed no weight loss up to 275° C. Examination of the TGA samples following completion of the temperature program clearly showed a foamed morphology.

TABLE 2

| Amine | Onset (°C.) | Complete (°C.) | Weight Loss, % |
|---|---|---|---|
| EDA | 62 | 140 | 9.7 |
| 1,4-DAC | 65 | 140 | 4.8 |
| PIP | 78 | 170 | 8.4 |

The amount of carbon dioxide fixed by the animated copolymers of Example E upon exposure to the gas was measured by TGA using a 0.100 ml platinum pan and operated at a heating rate of 10° C./min using a nitrogen gas purge at 50 ml/minute through the balance and furnace compartments.

The chemical composition of the gases evolved upon heating was determined by mass spectroscopy using a Dycor quadruple instrument. After exposing an amino-copolymer in the bulk state to $CO_2$ at its vapor pressure, the product of the reaction was sealed in a vial under a nitrogen atmosphere. Mass spectroscopy data were collected by first sampling the ambient air for 1 minute. Immediately thereafter, the sampling capillary was inserted into the vial and the gases inside the vial were analyzed at ambient temperature for 1 minute. Finally, the vial was immersed in an oil bath preheated to 90° C. and data taken for another 15 minutes. In the course of this experiment, the instrument was set to monitor carbon dioxide, water and nitrogen.

Fourier transform infrared spectroscopy (Mattson Polaris) was used to probe for functional groups present at various stages of the $CO_2$ fix-release cycle. Samples for the FTIR experiments were prepared in the form of thin films cast from a solution of the aminated copolymer in chloroform. FTIR spectra of virgin film and that exposed to liquid $CO_2$ for several hours were recorded. Then the exposed sample was heated to 80° C. for 5 minutes in a vacuum oven and its FTIR spectrum is recorded again.

Figure 11:
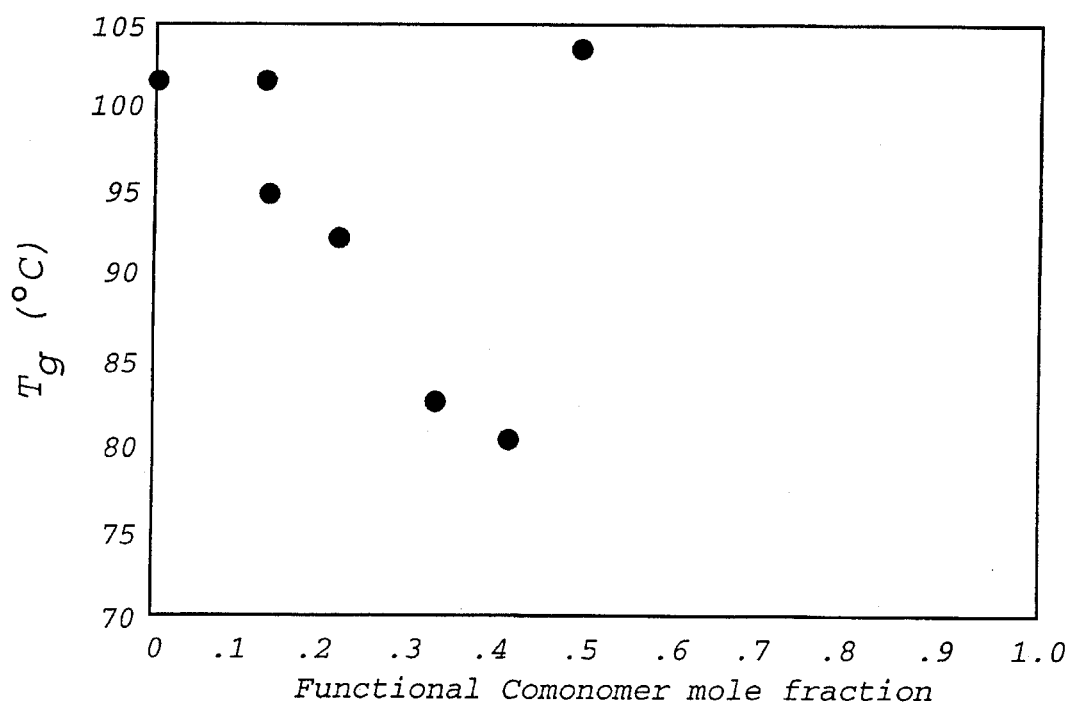
FIG. 11 is an illustration of the glass transition behavior of EDA-functional copolymers.

The glass transition temperatures of the amino-functional copolymers were found to be a function of amino structure as shown in Table 3 and amine content as indicated in FIG. 11.

TABLE 3

Glass Transition Temperatures of Amine-Copolymers as a Function of Structure and Composition

| Amine Type | Structure | Comonomer Mole Fraction 0.13 | 0.24 |
|---|---|---|---|
| EDA | $H_2N(CH_2)_2NH_2$ | 101 | 92 |
| N-MEDA | $HNCH_3(CH_2)_2NH_2$ | 84 | 90 |
| N,N-DMEDA | $(H_3C)_2N(CH_2)_2NH_2$ | 103 | 91 |
| N,N'-DMEDA | $H_3CNH(CH_2)_2NHCH_3$ | 101 | 79 |
| N,N,N'-TMEDA | $(H_3C)_2N(CH_2)_2NHCH_3$ | 97 | 94 |
| TETA | $H_2N(CH_2)_2NH(CH_2)_2NH(CH_2)_2NH_2$ | — | 70 |

As can be seen in FIG. 11 low amounts of EDA-functional comohomer act to plasticize the polymer, lowering $T_g$ from 102° C. (styrene homopolymer) to 80° C. at 40 mole %, further addition of EDA-functional comonomer dramatically increases $T_g$, such that a 50/50 copolymer exhibits a $T_g$ of 103° C., and copolymers with high functional comonomer content (60, 75 and 100%) did not show any thermal transition within the range of −60° to 300° C. These polymers are readily soluble in chloroform/methanol mixtures; thus it is not likely that crosslinking has produced this anomalous $T_g$ behavior. TGA measurements revealed that these materials undergo no weight loss up to 300° C. indicating a thermal stability comparable to that of a styrene homopolymer.

Preferably, therefore, the functional comohomer content is kept below approximately 40%. Most preferably the functional comonomer content is between approximately 20% and 40% (e.g. x:y in FIGS. 1, 2, 4, 5 and 6 preferably is in the range of approximately 4:1 to 3:2).

Figure 12A:
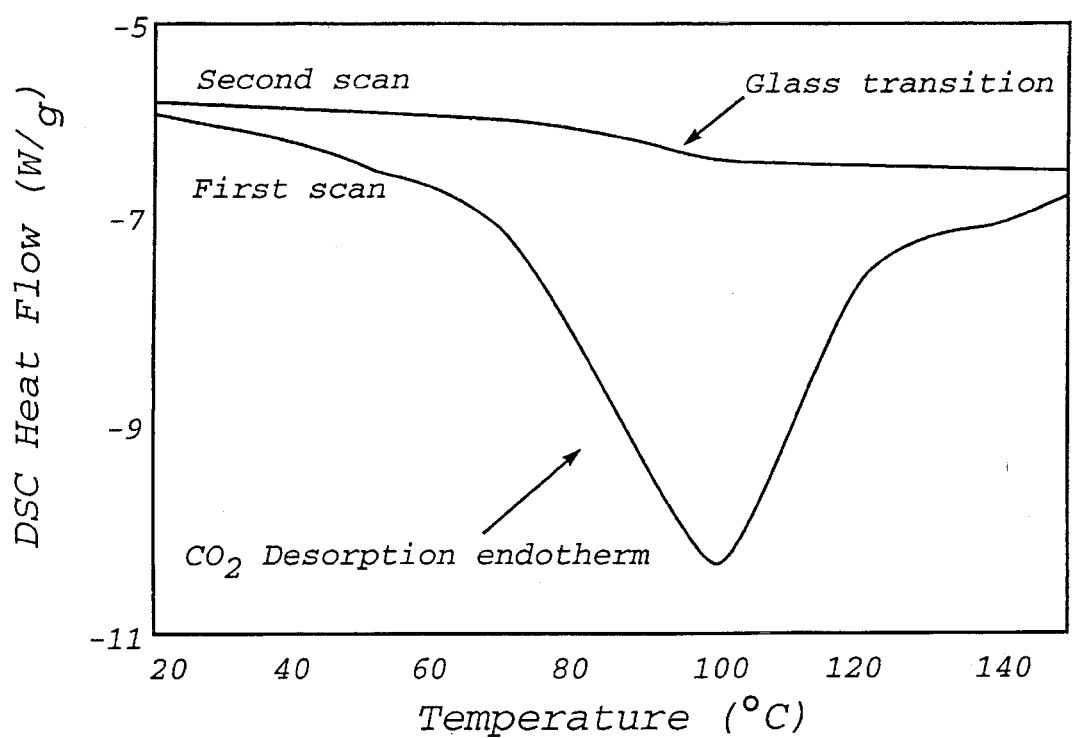
FIG. 12A is an illustration of a DSC scan of $CO_2$ release by EDA-copolymer/$CO_2$ reaction products.
Figure 12B:
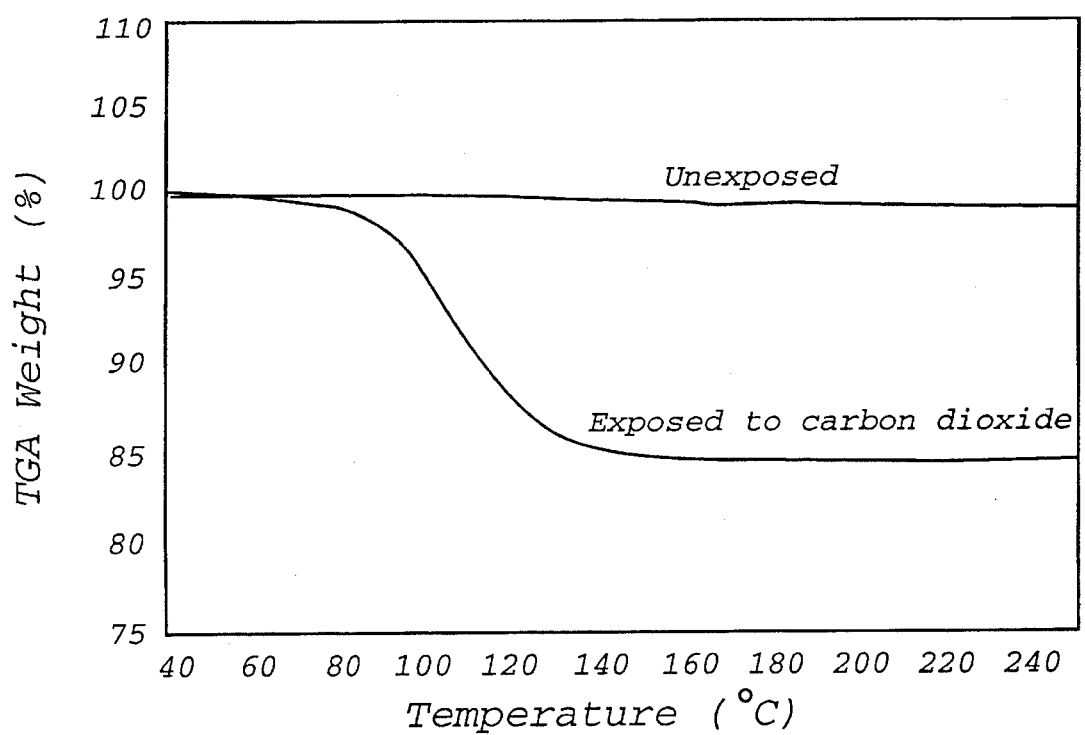
FIG. 12B is an illustration of a TGA scan of $CO_2$ release by EDA-copolymer/$CO_2$ reaction products.
Figure 13:
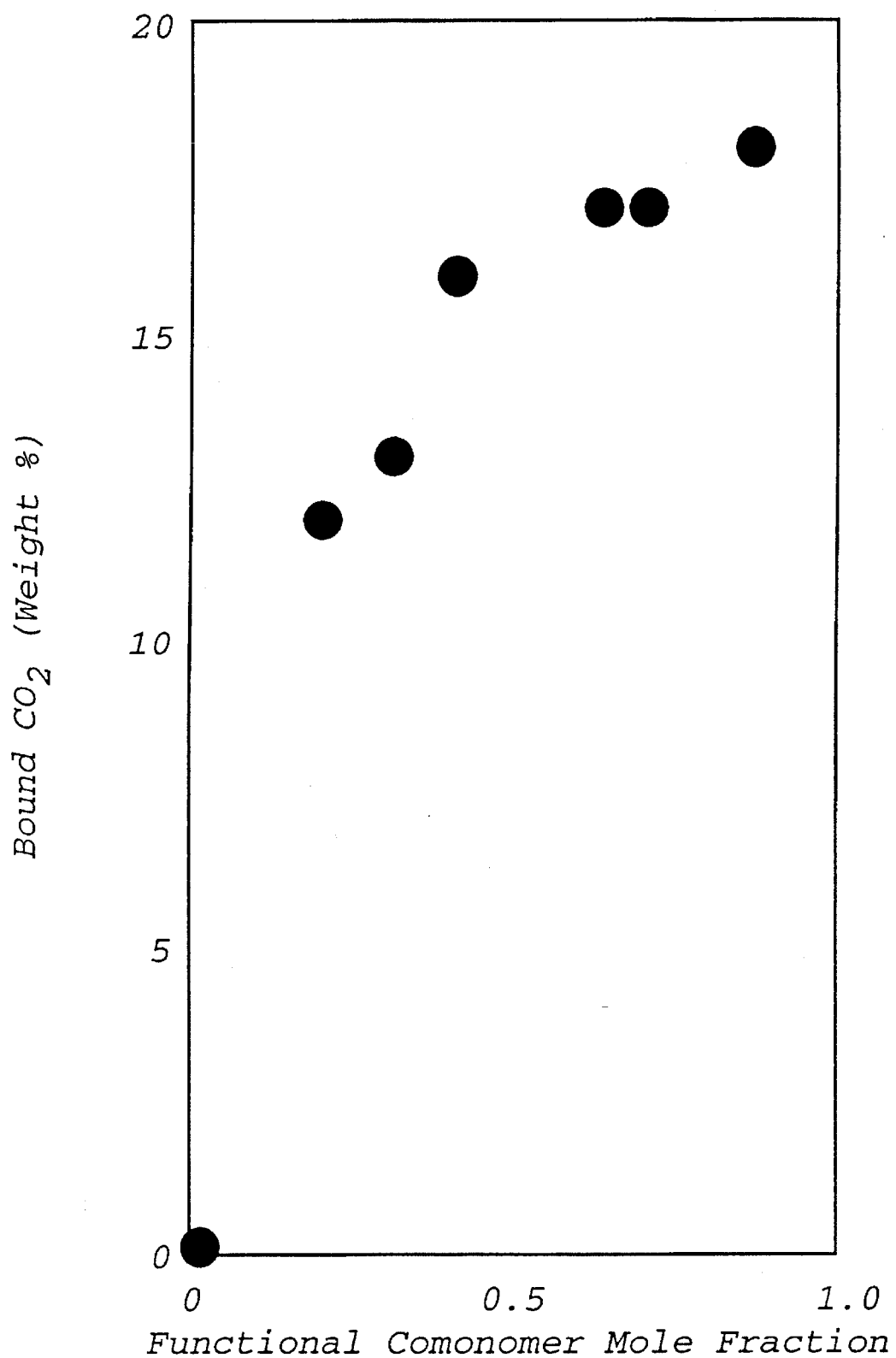
FIG. 13 is a graphical illustration of the $CO_2$ capacity of EDA-functional copolymer as a function of EDA content.

Following exposure to carbon dioxide, the amino-functional polymers of Example E were allowed to age at atmospheric conditions for 24 hours prior to TGA experiments. Typical $CO_2$ desorption curves recorded by DSC and TGA are shown in FIGS. 12A and 12B. As can be seen, the weight loss resulting from $CO_2$ release occurred abruptly and was complete relatively quickly. The non-linear dependency of adsorbed $CO_2$ weight fraction (see FIG. 13) and amine content is believed to be a result of $CO_2$ diffusion limitations, poorer solubility of the copolymer at higher amine loadings and inaccessibility of amine sites entrapped in the bulk of the precipitate during reaction with $CO_2$.

The amount of carbon dioxide bound by these copolymers is a function of amine structure as shown in Table 4.

TABLE 4

$CO_2$ Binding as a Function of Amine Structure and Reaction Conditions

| Amine Type | Bound $CO_2$ Weight % Method A | Method B |
|---|---|---|
| EDA | 3.8 | 13 |
| N-MEDA | 1.7 | 5.6 |
| N,N-DMEDA | 1.9 | 4.2 |
| N,N'-DMEDA | 1.0 | 4.0 |
| N,N,N'-TMEDA | 1.1 | 1.8 |
| Polystyrene Homopolymer | <0.1 | |

Method A: Amino-copolymer exposed to liquid $CO_2$ at its vapor pressure
Method B: Amino-copolymer exposed $CO_2$ at 1 atmosphere in chloroform solution The data suggest the following generalizations:
1. Binding capacity of pendant amine groups increases as amine basicity (relative to a Lewis acid such as $CO_2$) increases; i.e., primary > secondary > tertiary.
2. Thermal stability of amine-$CO_2$ adducts appears to increase upon attachment of the amine to the polymer backbone, in that a tertiary amine-functional polymer binds $CO_2$ (albeit a small amount) whereas a low molecular tertiary amine does not.
3. Placement of the amine groups (relative to the phenyl groups) has little or no effect on $CO_2$-binding capacity (compare results for N,N-DMEDA (secondary-tertiary) and N,N'-DMEDA (tertiary-secondary)).

Figure 14:
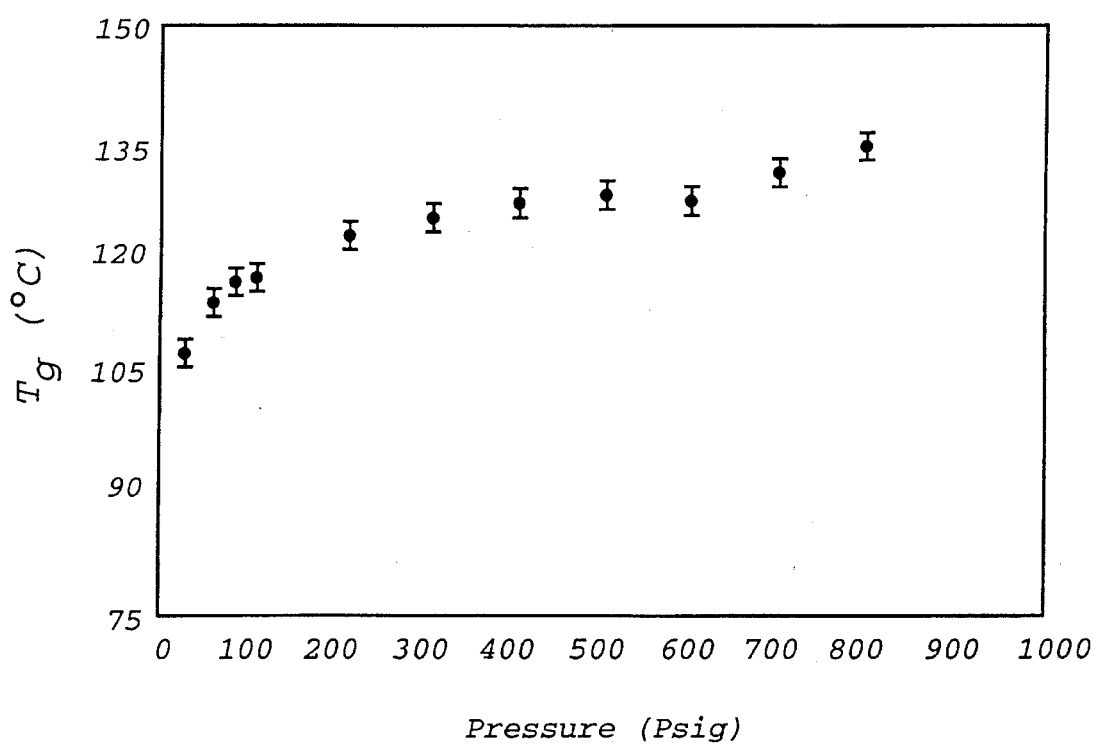
FIG. 14 is a graphical illustration of desorption onset temperature ($T_d$) as a function of pressure.

As shown by the TGA and DSC scans, the onset of catastrophic thermal dissociation occurs at 70° C. and is complete at 160° C. (at ambient pressure). Using a high pressure DSC cell it was observed that the $CO_2$ desorption endotherm is shifted to higher temperatures when the test pressure is increased as shown in FIG. 14. Visual as well as microscopic examination of the sample residues revealed that these products exhibit a foamed structure.

Figure 15:
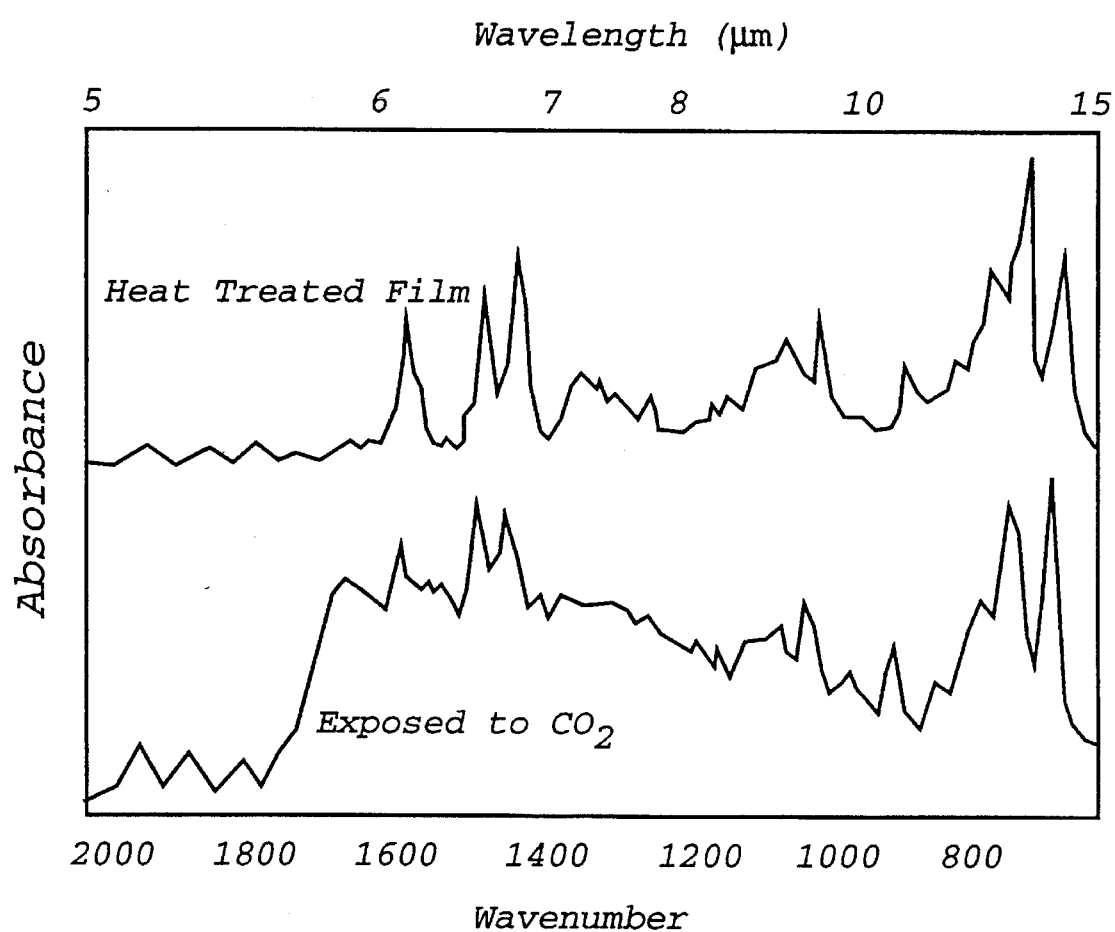
FIG. 15 is an illustration of FTIR spectra of EDA-functional copolymer; the upper curve is for film following $CO_2$ exposure and subsequent heat treatment; the lower curve is for film after $CO_2$ exposure alone.
Figure 16:
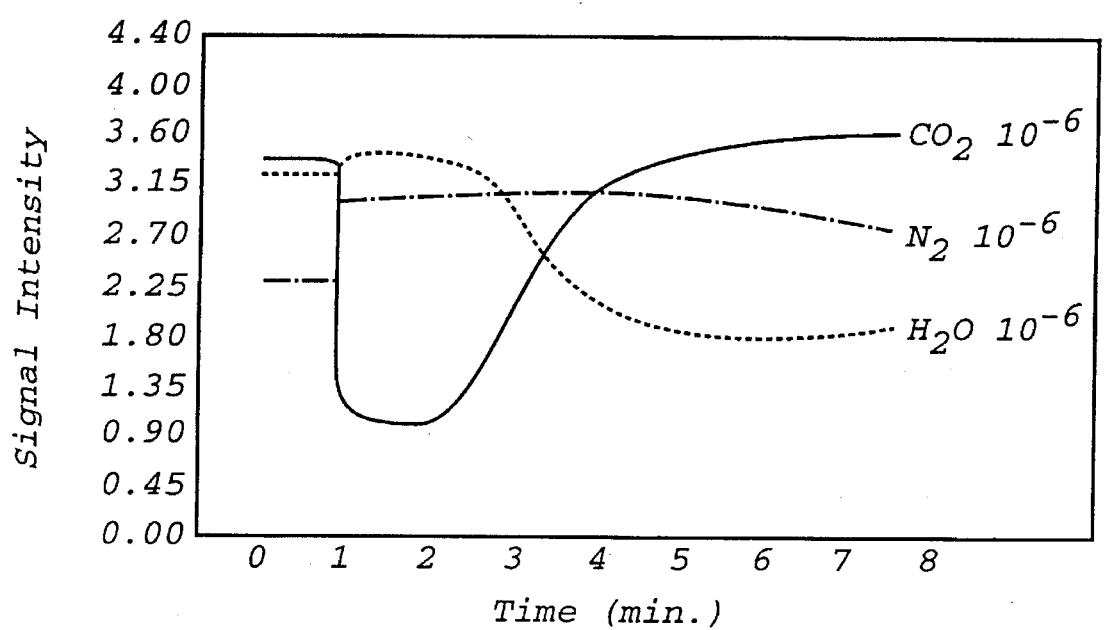
FIG. 16 is an illustration of mass spectroscopy data collected during thermally-initiated release of $CO_2$ from EDA-copolymer/$CO_2$ reaction product.

Mass spectroscopy experiments, in parallel with FTIR spectroscopy, proved to be a useful combination for the characterization of the reaction products and also for the investigation of possible side-reactions (such as the potential for urea formation). Typical spectra (see FIG. 15) do not exhibit absorption bands characteristic of urea functionalities (at 1650 cm$^{-1}$ in the case of diethylurea); suggesting that the decarboxylation step results in a clean regeneration of the original aminated copolymer. Further evidence in support of this observation is provided by the mass spectroscopy data presented in FIG. 16. Upon heating the $CO_2$/EDA-copolymer reaction products, the carbon dioxide signal increased by several orders of magnitude, whereas the water signal remained unchanged throughout the course of the experiment. Also, cyclic reactions of adsorption versus thermally induced desorption of $CO_2$ are fully reproducible, suggesting that the process of reacting the regenerating the amino sites proceeds cleanly.

Acid Gas Sotbents and Microporous Acid Gas Sorbents.

As shown above, linear copolymers incorporating pendant amino-groups readily fix $CO_2$ at ambient conditions, reverting to the original aminated polymer by releasing the polymer-bound $CO_2$ when heated to temperatures above 100° C. in general. It has been discovered that polymers incorporating amino-groups are good sorbents for acid gases other than $CO_2$. Linear and branched polymers for use as acid gas sorbents preferably have a $M_w$ greater than approximately 5000. More preferably, $M_w$ is greater than 10,000.

It has also been discovered that aminated polymers used as sorbents for acid gases are preferably formed as microporous beads to increase both the rate of binding and the binding capacity as a result of increased surface area. The polymer porosity is thus preferably maximized.

The surface area of linear aminated polymers can be advantageously maximized for use as acid gas sorbents by depositing such polymers as a coating or film upon a substrate. For example, the aminated polymer can be deposited as a coating upon glass beads.

Figure 17:
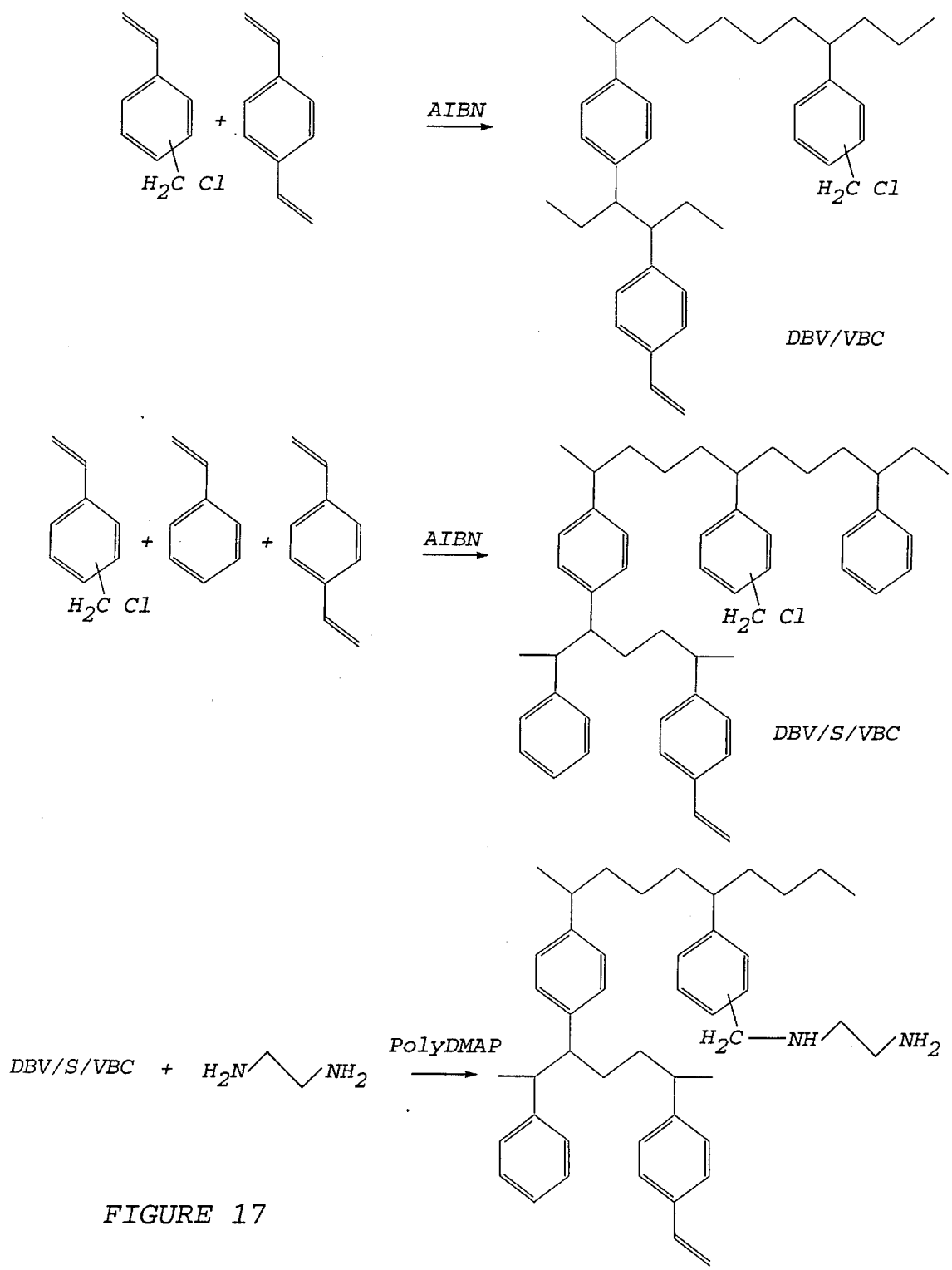
FIG. 17 is an illustration of a synthesis scheme for crosslinked beads.

As shown in FIG. 17, such microporous polymers are preferably prepared by solution polymerization of divinylbenzene-vinylbenzylchloride (DVB-VBC) and divinylbenzene-styrene-vinylbenzylchloride (DVB-S-VBC) systems to produce crosslinked microporous beads. As is the case with the linear precursors, the microporous copolymer precursors are then animated, producing polymeric sorbents with a variety of structures and topographic morphologies. Under ambient conditions all accessible amine groups are capable of reacting with acidic substrates to form relatively stable compounds, and complete desorption of the bound species can be accomplished by heat-conditioning, preferably at approximately 110° C.

The effects of particle size, BET surface area and amine content on the kinetics of, and ultimate capacity for acid gas binding by linear and crosslinked amino-polymers have been investigated. To explore the significance of mass transport limitations on the reaction kinetics, a porous-crosslinked beads and their equivalent non-porous linear counterparts were comparatively evaluated.

1. Synthesis of DVB-VBC crosslinked porous beads.

VBC (70% meta, 30% para), styrene and divinylbenzene (DVB, Aldrich) were each washed several times with a 0.5% aqueous sodium hydroxide solution to remove the polymerization inhibitors, and then rinsed with distilled water until the washings tested neutral to litmus paper. Molecular sieves were added to the monomers, which were then stored at 4° C. Prior to polymerization, the monomers were purified by distillation under vacuum (30 in. Hg), at 40° C. for styrene and DVB and 90° C. for VBC.

The crosslinked precursor was prepared in a toluene (Fisher) solution via a free radical polymerization initiated by AIBN (Aldrich). In a typical recipe, a 1000 ml three-neck round-bottom flask mounted with a reflux condenser was flushed with nitrogen for 2 hrs. The reactor was then charged with 50 ml toluene, 13 ml VBC (91.2 mmol), 7 ml DVB (49 mmol) and a solution of 23 mg AIBN in 3 ml toluene. The reactor was immersed in an oil bath preheated to 100° C. and stirred vigorously for 8 hours. The precursor colloidal dispersion was de-stabilized by pouring it into a large volume of methanol. The polymer was recovered by filtration, washed several times with methanol, re-dispersed in chloroform and re-coagulated in methanol. The product was then dried in a vacuum oven at 100° C.

2. Preparation of amine functional porous beads.

The crosslinked porous precursors were functionalized with EDA by nucleophilic substitution in a toluene solution (40° C.) under nitrogen in the presence of a polymer supported polyDMAP. In a typical amination, 35 ml EDA (525 mmol, Aldrich) and 40 ml toluene were placed in a 250 ml three-neck round-bottom flask previously flushed with nitrogen. The colloidal suspension of the DVB-VBC precursor (50 ml) was then added dropwise to the EDA solution while mixing. The slurry was stirred for 48 hrs and then heated to 80° C. for 4 hrs. To recover the product, the contents of the reactor were poured into a large volume of distilled water, stirred vigorously, after which the solvent was evaporated under vacuum. The polymer, in the form of a white powder, was washed with distilled water several times until the washings tested neutral to litmus paper, and then dried in a vacuum oven at 100° C.

3. Product Characterization

The chemical composition of the crosslinked beads was determined by elemental analysis for nitrogen and chlorine at Galbraith Laboratories; Knoxville, Tenn. High resolution proton-NMR was used to complement the elemental analysis results. Fourtier transform infrared spectroscopy (FTIR) (Mattson Polaris instrument) was also used to probe the chemical structure of the DVB/VBC precursor and the amino-functional product. Spectra were recorded on solid samples prepared in the form of KBr wafers.

The chemical compositions of the polymer precursors and the amino-functional crosslinked beads were determined via elemental analysis of nitrogen and chlorine. The results of these measurements, set forth in Table 15 below, indicate that as the mole fraction of the crosslinker (DVB) increases, the conversion of chloromethyl to aminofunctional product decreases. This result arises from a lower degree of swelling of the polymer by the amine solution because of higher crosslink density.

TABLE 5

| Sample: | BEAD 1 | BEAD 2 | BEAD 3 |
| --- | --- | --- | --- |
| DVB (ml in feed) | 7 | 7.5 | 7 |
| VBC (ml. in feed) | 13 | 10 | 3 |
| S (ml. in feed) | 0 | 0 | 0 |

TABLE 5-continued

| Sample: | BEAD 1 | BEAD 2 | BEAD 3 |
|---|---|---|---|
| Nitrogen (weight %)(*) | 7.84 | 59 | 3.62 |
| Chlorine (weight %)(*) | .68 | 1.21 | .79 |
| Conversion (%) | 94 | 86 | 85 |
| Functional comonomer mole fraction | .43 | .32 | .18 |
| BET surface area (m$^2$/g) | 49 | 43 | 45 |

(*)Evaluated by elemental analysis at Galbraith Laboratories, Knoxville, TN.

Consequently, at low VBC mole fractions, styrene spacers were inserted into the network to maintain similar crosslink densities and thus ensure similar chemical structures. Further, attempts to prepare crosslinked precursors with a VBC to DVB mole ratio higher than that of the precursor of BEAD 1 of Table 5 resulted in soluble, non-crosslinked materials, i.e., branched copolymers of VBC and DVB.

Figure 18:
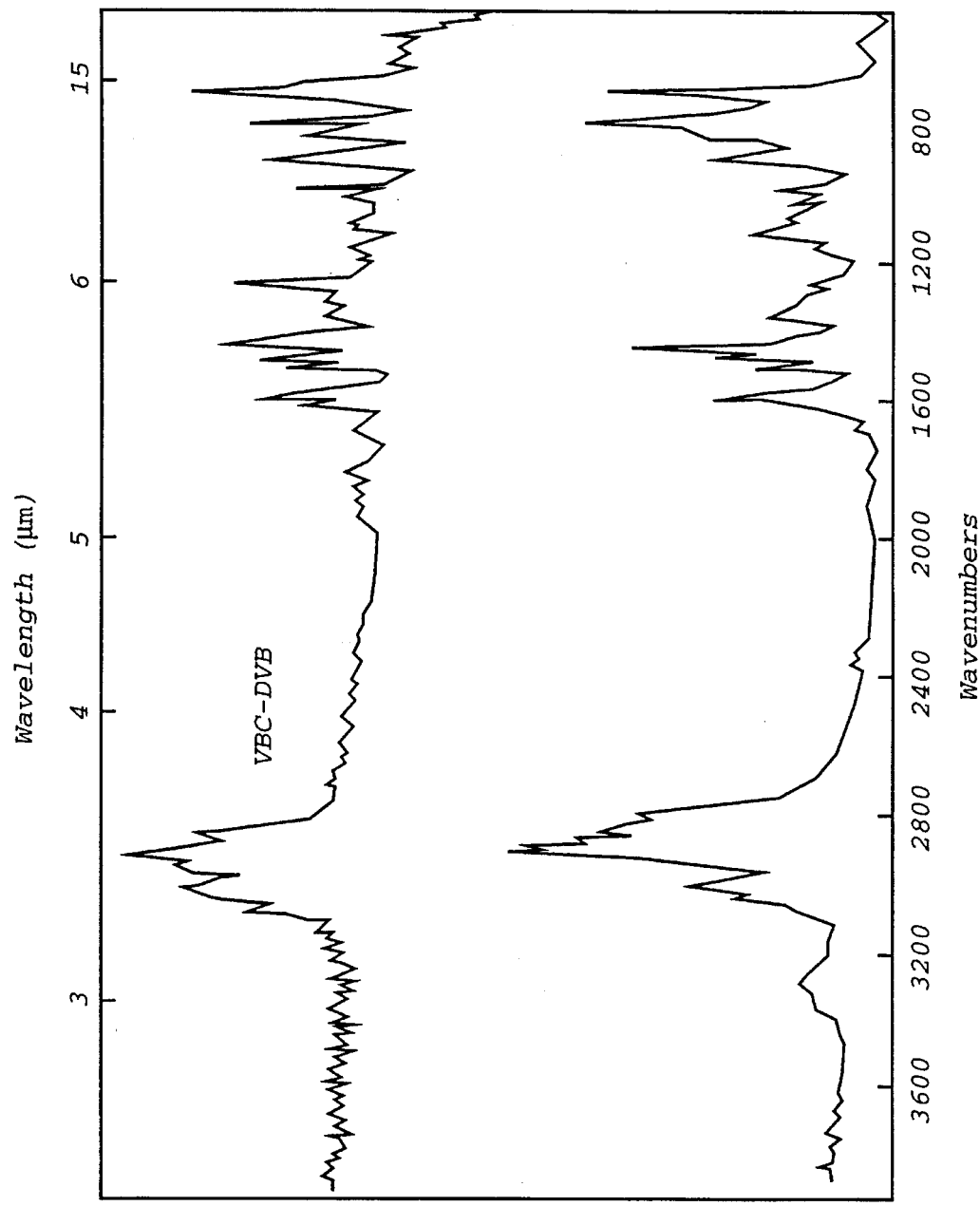
FIG. 18 is an illustration of FTIR spectra of precursor versus aminated product.

Typical FTIR spectra of solid KBr/copolymer wafers as shown in FIG. 18 indicate the formation of an amine-functional product as evidenced by the appearance of a medium absorption band as a doublet indicative of primary amine groups and centered at 3400-3200 cm$^{-1}$ (N-H stretch) and the characteristic C-N stretch band at 1120-1110 cm$^{-1}$. Spectra recorded on the DVB/VBC crosslinked precursors also showed the presence of a C=C stretch at 1630-1620 cm$^{-1}$ arising from unreacted vinyl groups of the DVB units. Thermal analysis of crosslinked beads revealed no transition within the temperature range −80° to 300° C. and no weight loss by TGA up to 300° C.

4. Binding studies of acid gases by aminated polymers

The ability of the aminated polymers to bind carbon dioxide reversibly was tested by a number of means including mass spectroscopy (Dycor quadrupole apparatus). The binding step was carried out in a batch mode a using 250 ml flask loaded with the aminated polymer (130 mg, 0.33 mmol amine) which was heated to 90° C. in an oil bath for 30 minutes under a steady flow of nitrogen purge gas (1000 ml/min) to ensure that all polymerbound $CO_2$ (formed upon exposure to air) was evolved. After cooling the reactor, $CO_2$ (0.3 ml, 0.012 mmol) was injected into the flask. The ability of these aminated polymers to bind $CO_2$ was assessed by measuring the $CO_2$ concentration in the reaction flask. Debonding of $CO_2$, and thus regeneration of free amine sites, was confirmed by monitoring the $CO_2$ signal upon heating of the polymer to 75° C. For the cases of $SO_2$ and NO, thermogravimetric analysis (described below) was used to assess the ability of the polymeric sorbents to bind these gases cleanly and reversibly. The present aminated polymers have also been shown for reversibly bind $H_2S$.

5. Thermal analysis.

Reactions of acid gases ($CO_2$, $SO_2$, NO) with polymer-anchored amines were followed in a TGA apparatus (TA 2000 system) by exposing the polymer powder to the pure substrates as purge gases. Gas mixtures with concentrations reflecting those encountered in typical stack emissions (14% $CO_2$, 1% $SO_2$ and 0.5% NO, each balanced with nitrogen) were used. Because the aminated polymers fix $CO_2$ from the atmosphere, polymers were thermally regenerated prior to all binding studies. The full procedure for examination of acid gas binding experiments is given below:

1. Set the nitrogen purge rate at 200 cm$^3$/min.
2. Ramp at 10° C./min. from room temperature to 105° C., or to a temperature 5° C. below Tg (glass transition) for the linear polymers.
3. Maintain isothermally for 30 minutes.
4. Equilibrate at 80° C.; maintain under isothermal conditions for 1200 minutes.
5. Equilibrate at 25° C., then reduce the nitrogen purge rate to 50 cm$^3$/min and maintain isothermally for the remainder of the experiment.
6. Switch purge gas to $CO_2$, $SO_2$, $H_2S$, $NO_2$ or NO. Complete reaction of all accessible amine sites with the acid gas was considered to have been attained when no weight change within the sensitivity limits of the instrument is detected within a 60 minute time interval.

The heat of reaction of the acid gas binding process was measured by DSC using a standard cell, $CO_2$ as purge gas at a rate of 50 cm$^3$/min, and polymeric sorbent samples in the bulk state contained in open pans. In the experiments the most critical step is the precise measurement of the sample weight in that the sample to be analyzed must be free of any absorbed substrates when measuring the weight. As a result the TGA instrument was used to determine the sample weight following the procedure below:

1. Set up the instrument under isothermal conditions at 25° C. and a nitrogen purge rate of 50 cm$^3$/min.
2. Place an empty DSC pan in the TGA and zero the instrument.
3. Place the polymeric sorbent sample inside the DSC pan and reload the whole into the TGA instrument.
4. Heat-treat the sample as described previously from step 1 to 5.
5. Record the sample weight during the course of step 5. The DSC pan is then removed and loaded carefully into the DSC cell. The sample is again heat-treated using the same procedure to drive off any bound-$CO_2$ during the brief exposure of the sample to ambient air prior to switching to acid gas purge.

In the study of $CO_2$ debonding by DSC, the polymer was exposed to $CO_2$ at its vapor pressure in a high pressure reactor for two minutes and then allowed to age at ambient conditions for several hours. The product was then encapsulated in an aluminum pan and its thermogram recorded using a 50 ml/min nitrogen purge and a heating rate of 10° C./min.

Thermal analysis of the uncrosslinked materials showed no weight loss below 300° C., but revealed curious behavior regarding the effect of amine content on the glass transition temperature ($T_g$). As shown in FIG. 11 as amine content initially increases, $T_g$ decreases due to the familiar side-chain plasticization effect. However, at an amine content of approximately 40%, $T_g$ exhibits a minimum, and quickly rises to a point above 300° C. as amine content approaches 60%. The high amine content copolymers are not crosslinked, as they were recovered from homogeneous solutions after their synthesis. Consequently, it is surmised that strong interchain interactions between amines and phenyl groups are behind this anomalous $T_g$-behavior.

The porosity of the polymeric sorbents was determined by measuring their surface area per gram of product using the BET sorption technique. The linear copolymers were found to have surface areas ranging from 28 to 33 m$^2$/g, consistent with values characteristic of non-porous materials. The crosslinked beads were found to have higher surface areas than their linear counterparts (see Table 5) and clearly exhibit a porous morphology as shown by electron micrographs.

6. Cyclic binding-debonding of acid gas.

Figure 19:
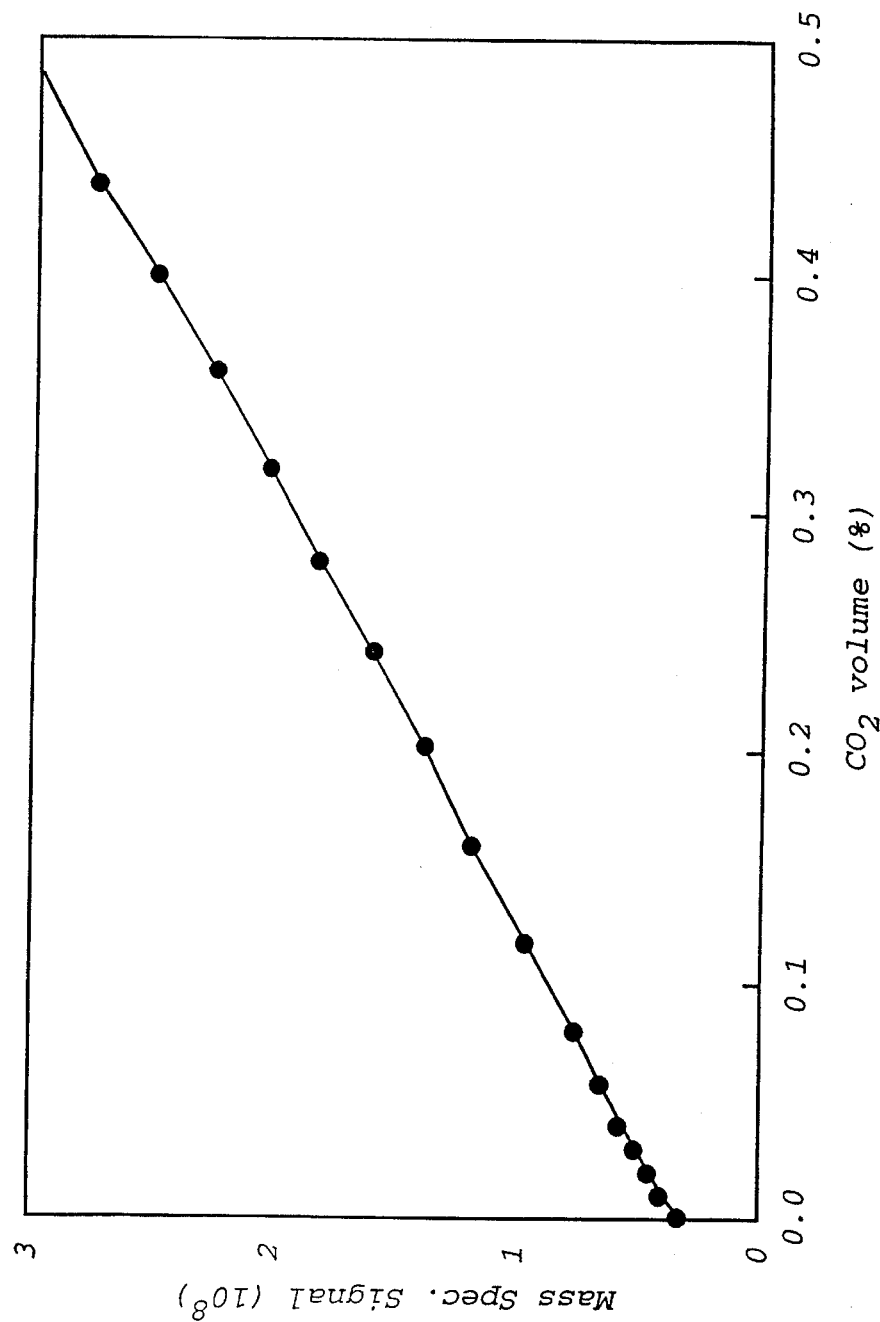
FIG. 19 is an illustration of calibration curve of a mass spectrometer.

Porous crosslinked polymer beads carrying pendant amino-groups bind carbon dioxide when exposed to ambient air and undergo reversible fix-release cycling with $CO_2$ without alteration to their chemical nature. Mass spectroscopy was used to follow the binding/debonding of $CO_2$ by porous, crosslinked amino-functional polymers. As illustrated in FIG. 19, the spectrometer was first calibrated with gas mixtures of $CO_2$ in nitrogen of known composition and then set to monitor $CO_2$. The experiments were conducted under ambient conditions after heat-treating the polymer as summarized previously. Ambient air was analyzed for 0.5 minutes, then the sampling needle was inserted into the flask containing 130 mg polymer sorbent (0.33 mmol amine) in an atmosphere of 250 ml nitrogen and 0.3 ml $CO_2$ (0.012 mmol).

Figure 20:
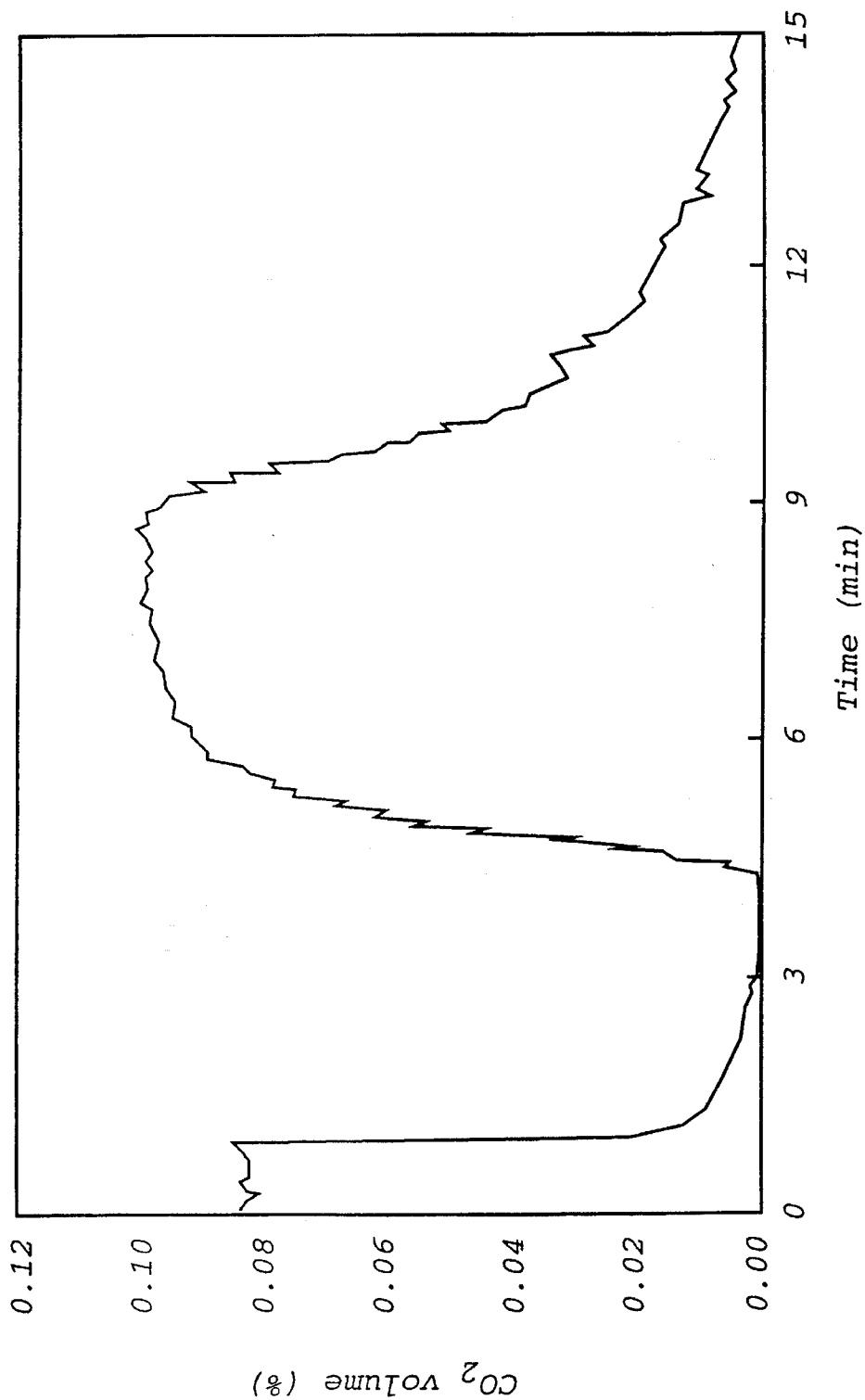
FIG. 20 is an illustration of binding/debonding of $CO_2$, monitored by mass spectroscopy.

As shown in FIG. 20, in the presence of the sorbent, the $CO_2$ concentration was reduced to within the lower limits of detection of the instrument within 2 minutes, revealing rapid $CO_2$-binding by these microporous materials. At time t=4 min, the flask was immersed in an oil bath at 75° C. and the $CO_2$ concentration increases rapidly as $CO_2$ is released by the sorbent via thermal dissociation (thus regenerating the free amine groups of the polymer). At time t=8 min, the flask was removed from the oil bath and immersed in a water bath at room temperature. Upon cooling of the system, $CO_2$ bound again to the polymer, as evidenced by the quick decrease of $CO_2$ concentration in the flask.

Figure 21A:
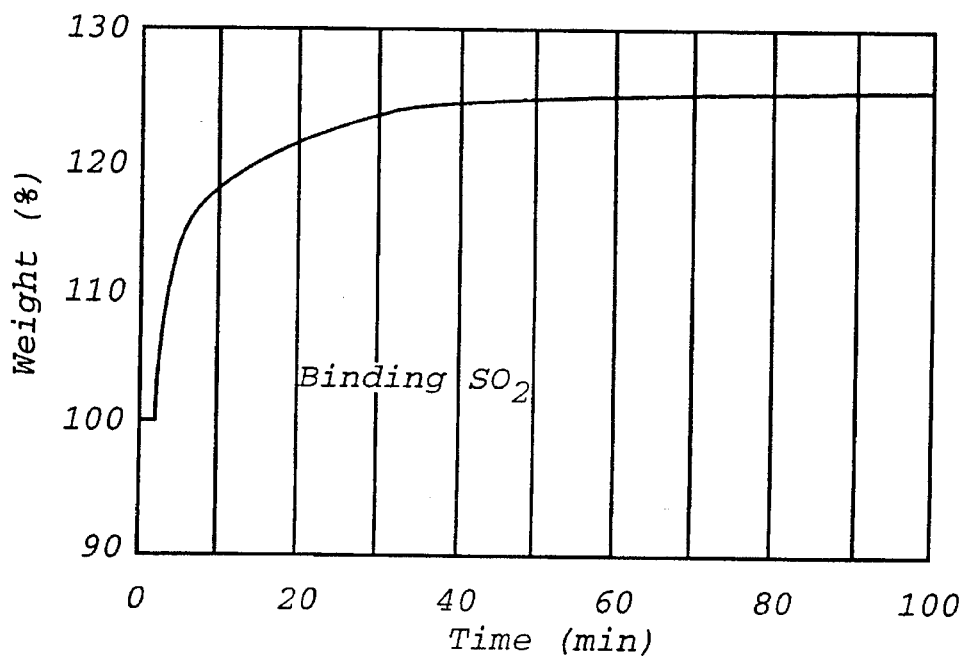
FIGS. 21A–21D are illustrations of binding/debonding of $SO_2$ and NO recorded by TGA.
Figure 21B:
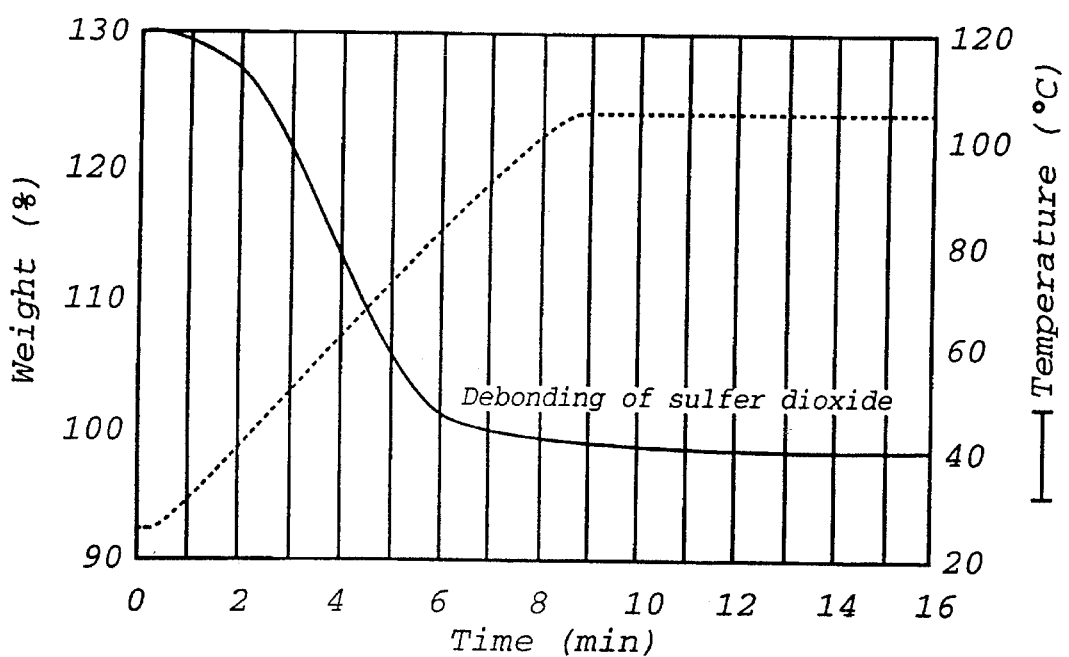
Figure 21C:
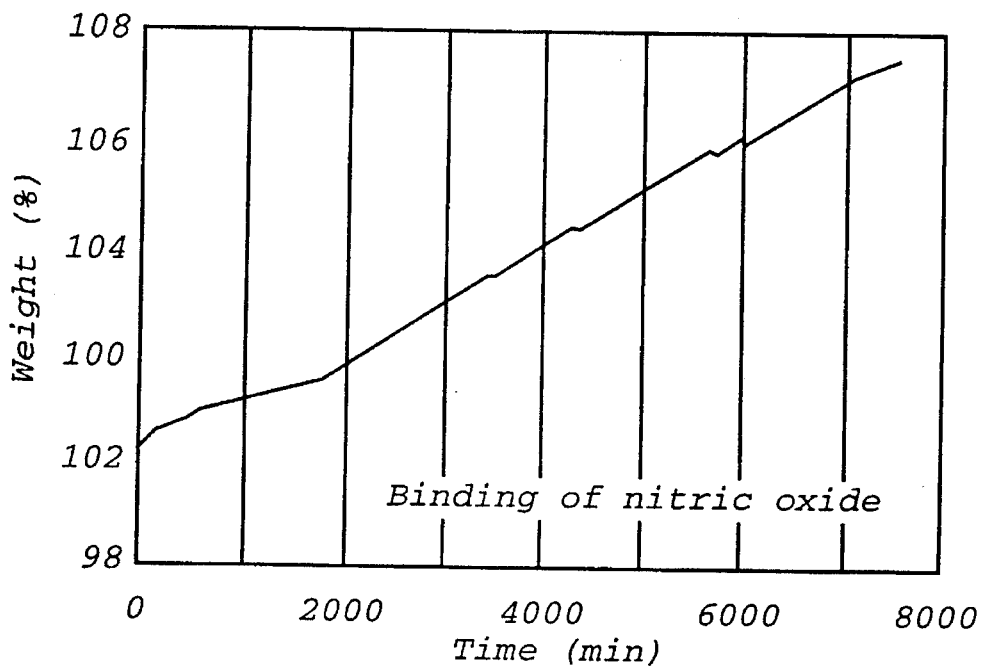
Figure 21D:
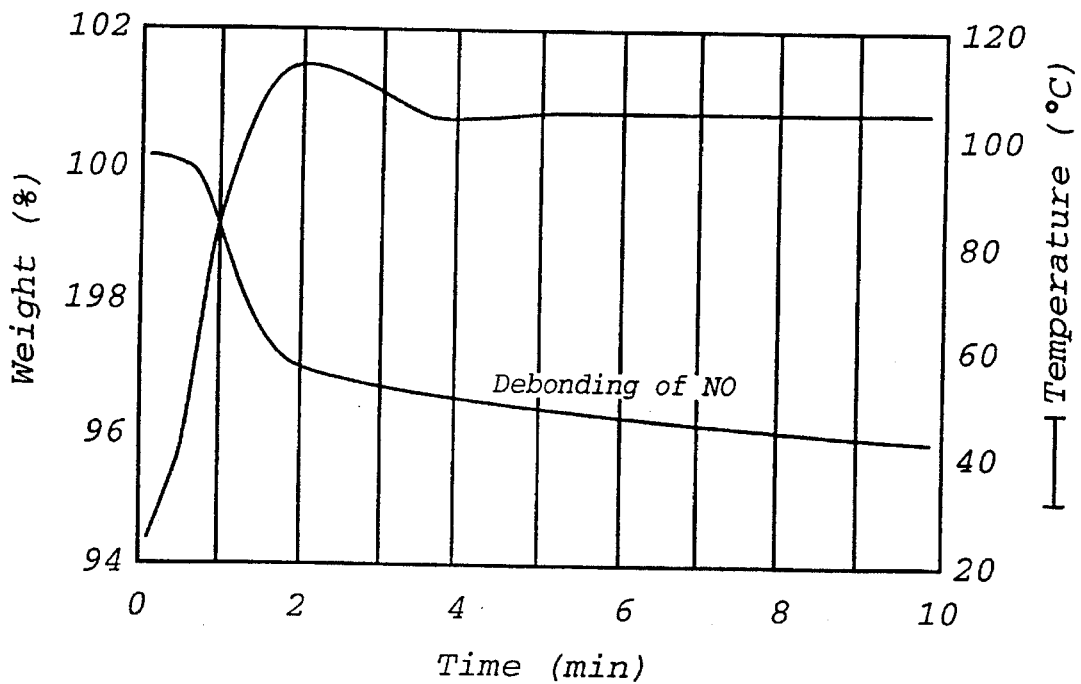

In the case of $SO_2$ and NO, the cyclic binding/debonding processes were recorded with TGA. Typical results, as shown in FIGS. 21A–21D, provide conclusive evidence for the ability of the sorbents to fix these substrates cleanly and reversibly. Furthermore, the total number of moles of bound $SO_2$ was more than double that of $CO_2$, presumably owing to the higher acidity of the former substrate. Similar observations are also applicable to nitric oxide as seen in FIGS. 21C and 21D. Using a 0.5% NO mixture with a nitrogen balance, a 6% (and still increasing) weight increase due to NO binding were recorded after 4 days of exposure. Moreover, FTIR spectra recorded on samples after several cyclic exposures to acid gas showed no alteration in their chemical structure.

Figure 22:
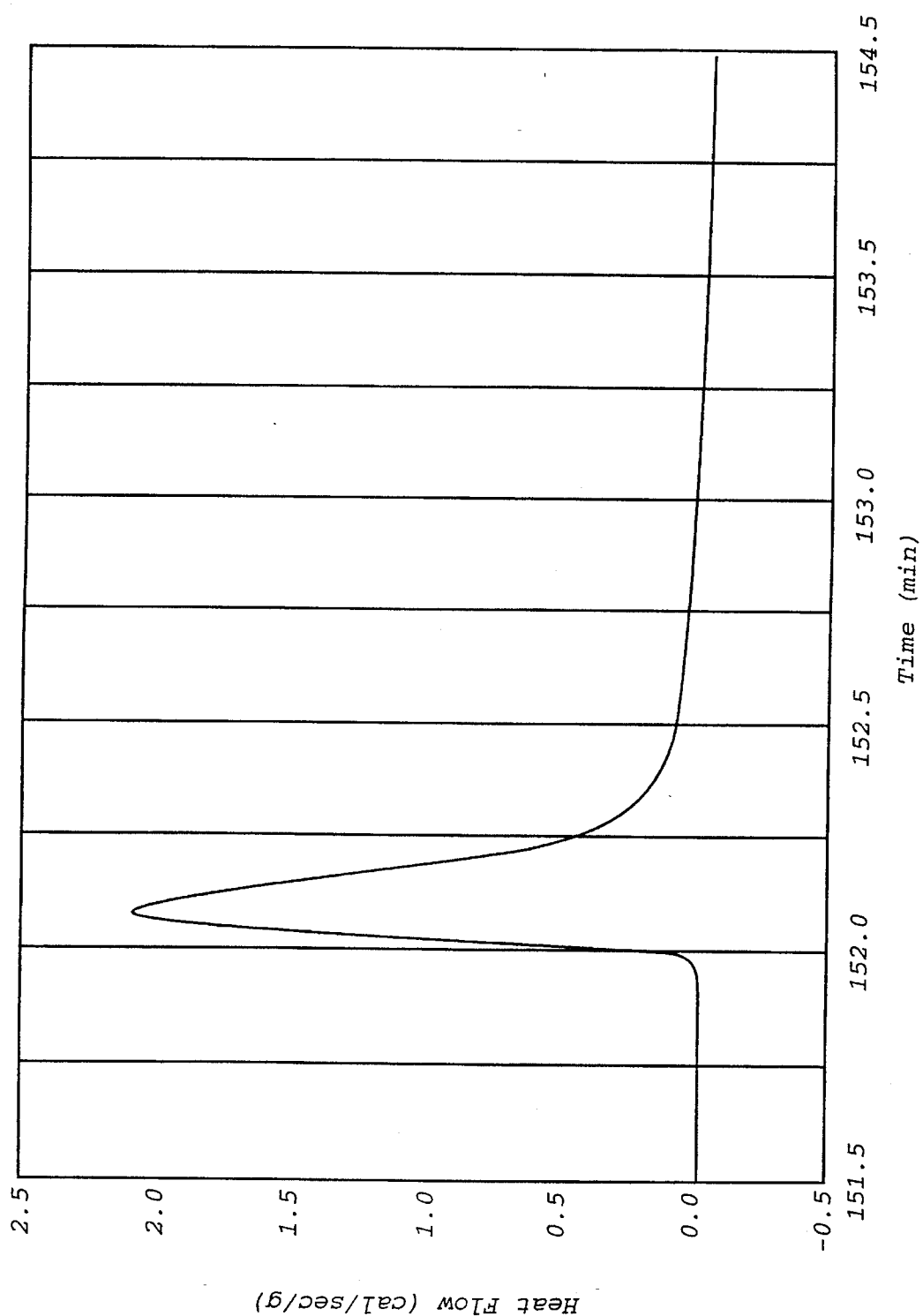
FIG. 22 is an illustration $CO_2$ binding exotherm recorded by DSC.
Figure 23:
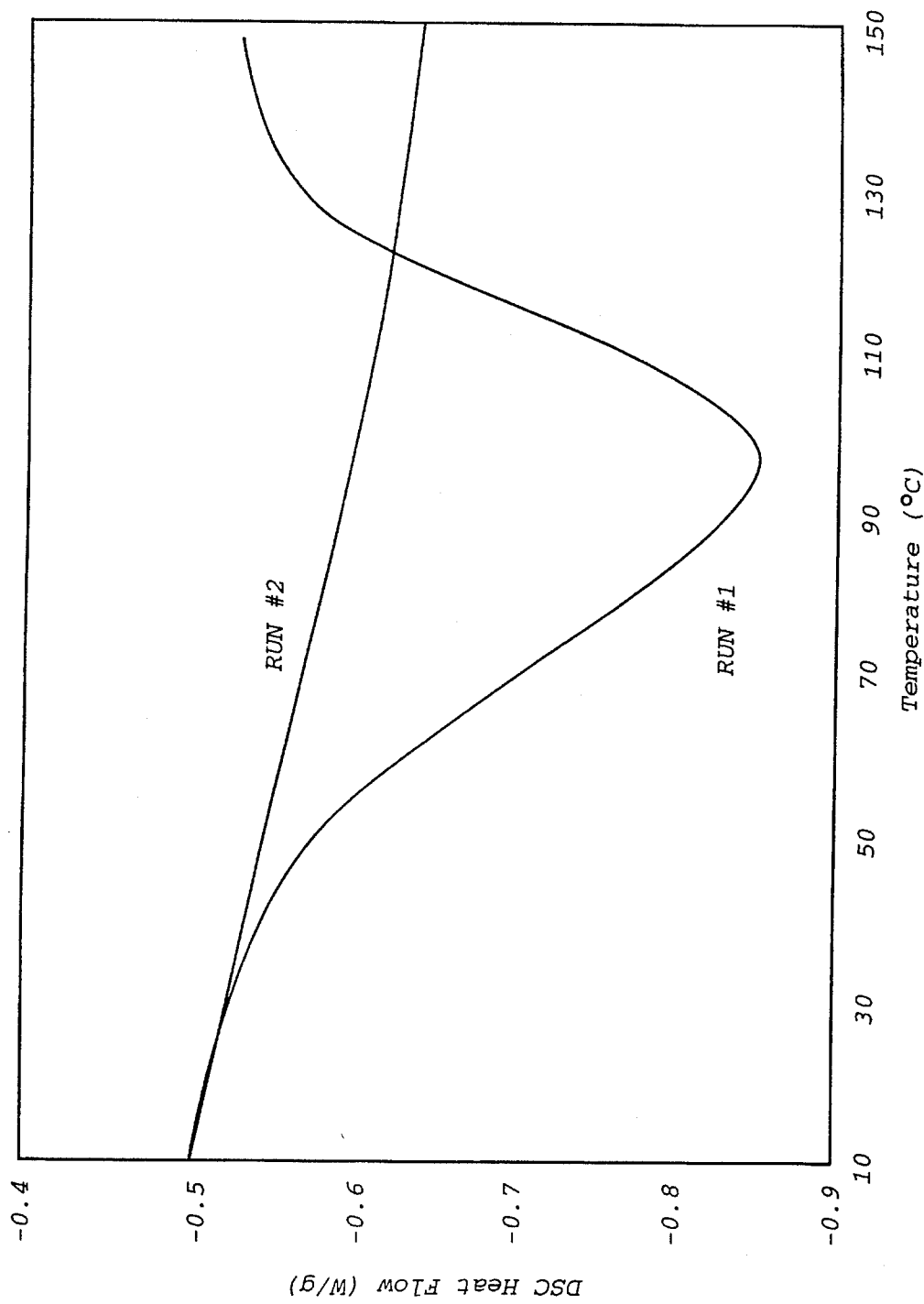
FIG. 23 is an illustration of $CO_2$ debonding endotherm.

Carbon dioxide binding and debonding were also followed by DSC. FIG. 22 shows a typical binding exotherm. The calculation of the heat of reaction based on the integration of the exotherms for several samples (linear copolymers with 20%, 40%, 75% functional comonomer mole fractions and the crosslinked beads with 40% functional comonomer mole fraction) gave an average value of 14 kcal/mole with an error of ±7%. Similarly, evolution of $CO_2$ was characterized by a large endotherm (see FIG. 23) whereas a second heat-up of the same sample does not show any thermal effect. A salient characteristic of these polymers is that upon exposure to ambient air even for a brief period of time, a large $CO_2$-degassing endotherm is always observed during the first heat-up in the DSC cell; a further indication of the high affinity of these materials to bind $CO_2$ from the air.

Figure 24:
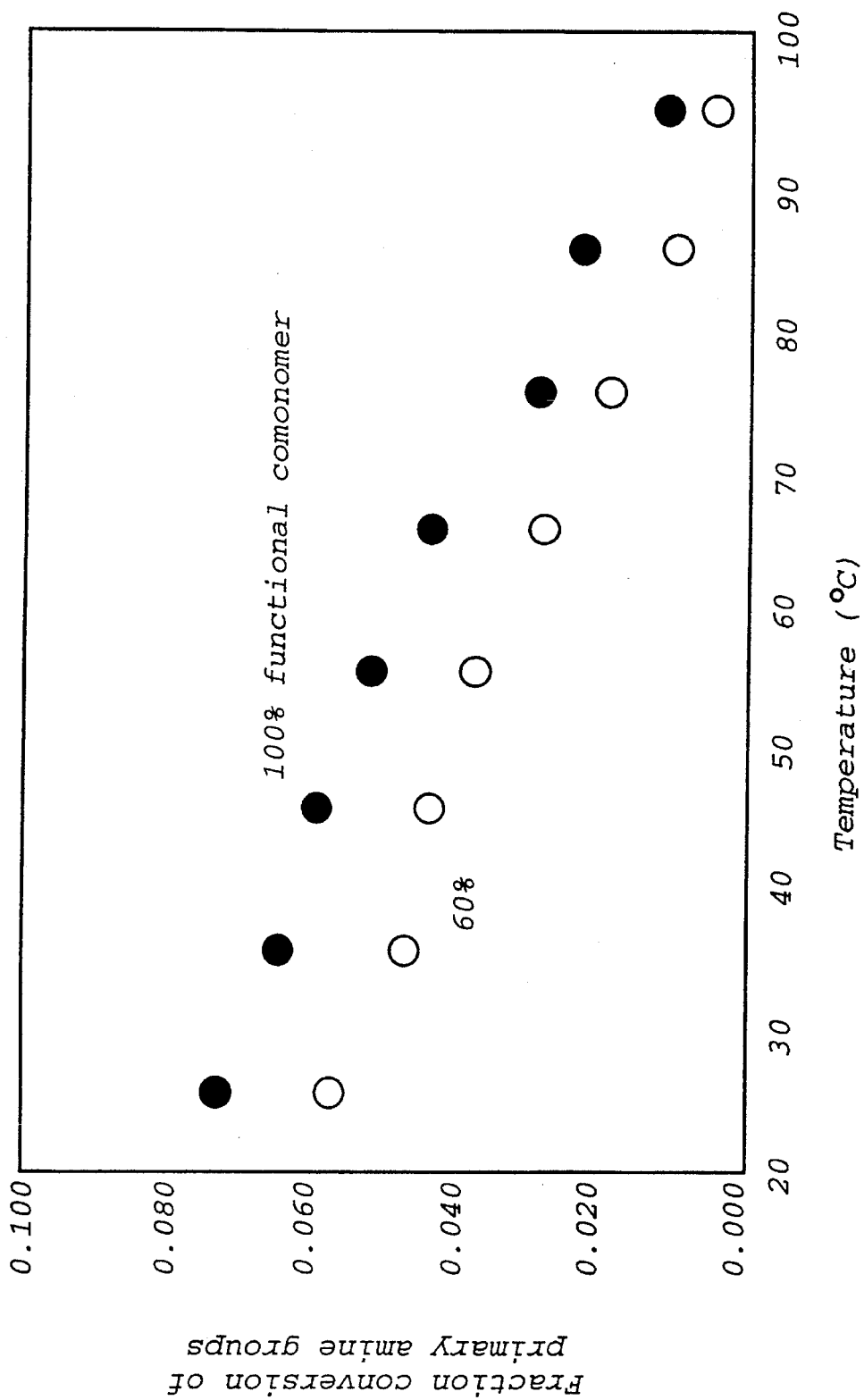
FIG. 24 is an illustration of a $CO_2$ binding capacity as a function of temperature.
Figure 25:
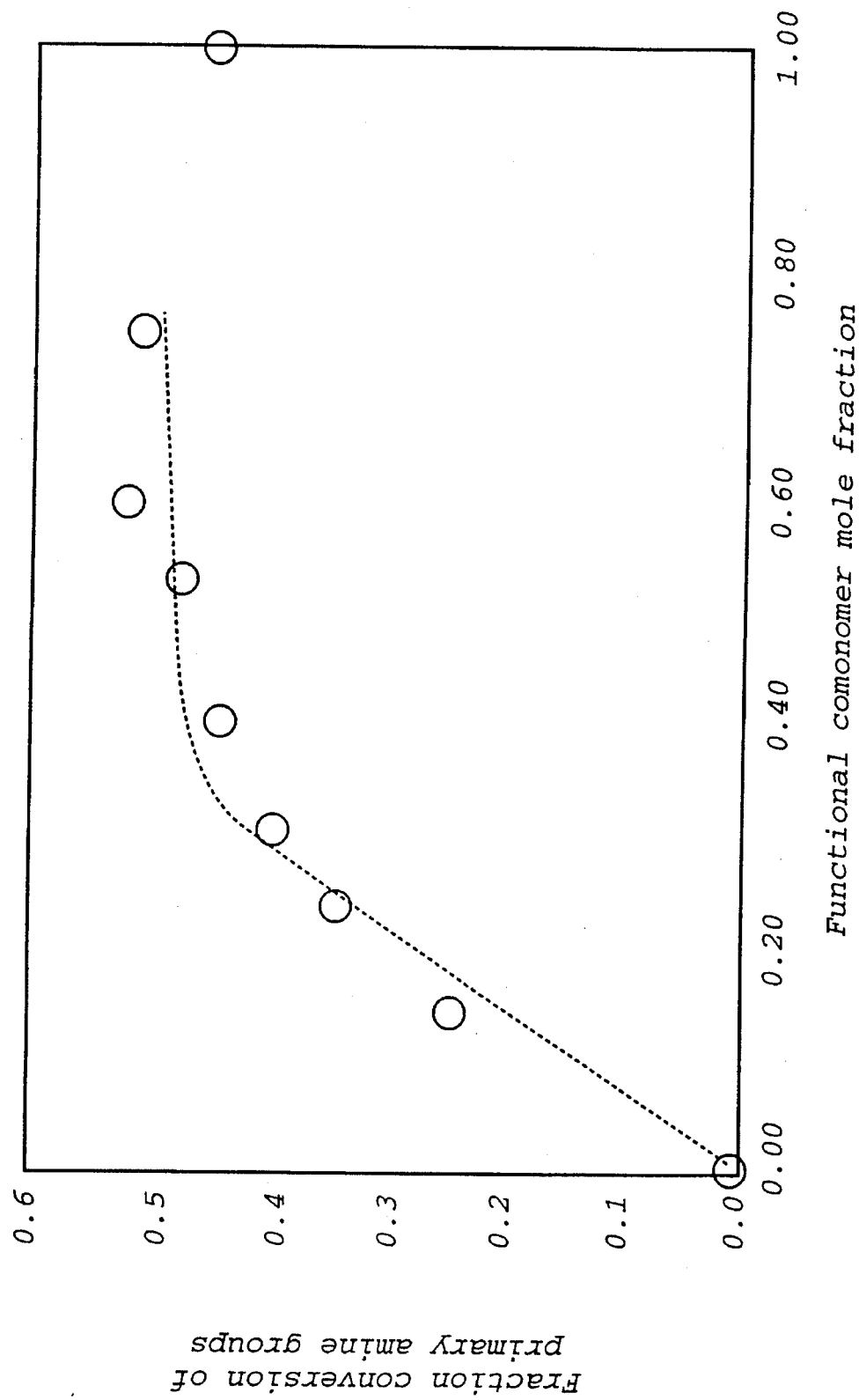
FIG. 25 is an illustration of fraction conversion of primary amine groups reacted versus amine content.

The $CO_2$-binding capacity of these polymers was evaluated at various temperatures ranging from 25° to 105° C. Since the reaction of $CO_2$ with the polymer amino-groups is exothermic one would expect the $CO_2$-binding capacity of these polymers to be highest at low temperatures (see FIG. 24). FIG. 24 also indicates that $CO_2$ does not bind to the polymer at temperatures exceeding 105° C. (under atmospheric pressure). It is important to note that a true equilibrium constant for these reactions could not be calculated because the reactive sites in the polymer particles are not equally accessible for reaction. FIG. 25 shows that at low amine content (below 40% functional comohomer) the mole fraction of reacted nitrogens is proportional to the functional comonomer mole fraction. Above 40%, the curve levels off, indicating that the functional comohomer mole fraction has no more effect on the mole fraction of reacted amine groups.

7. Effect of mass transport on $CO_2$-binding.

Figure 26:
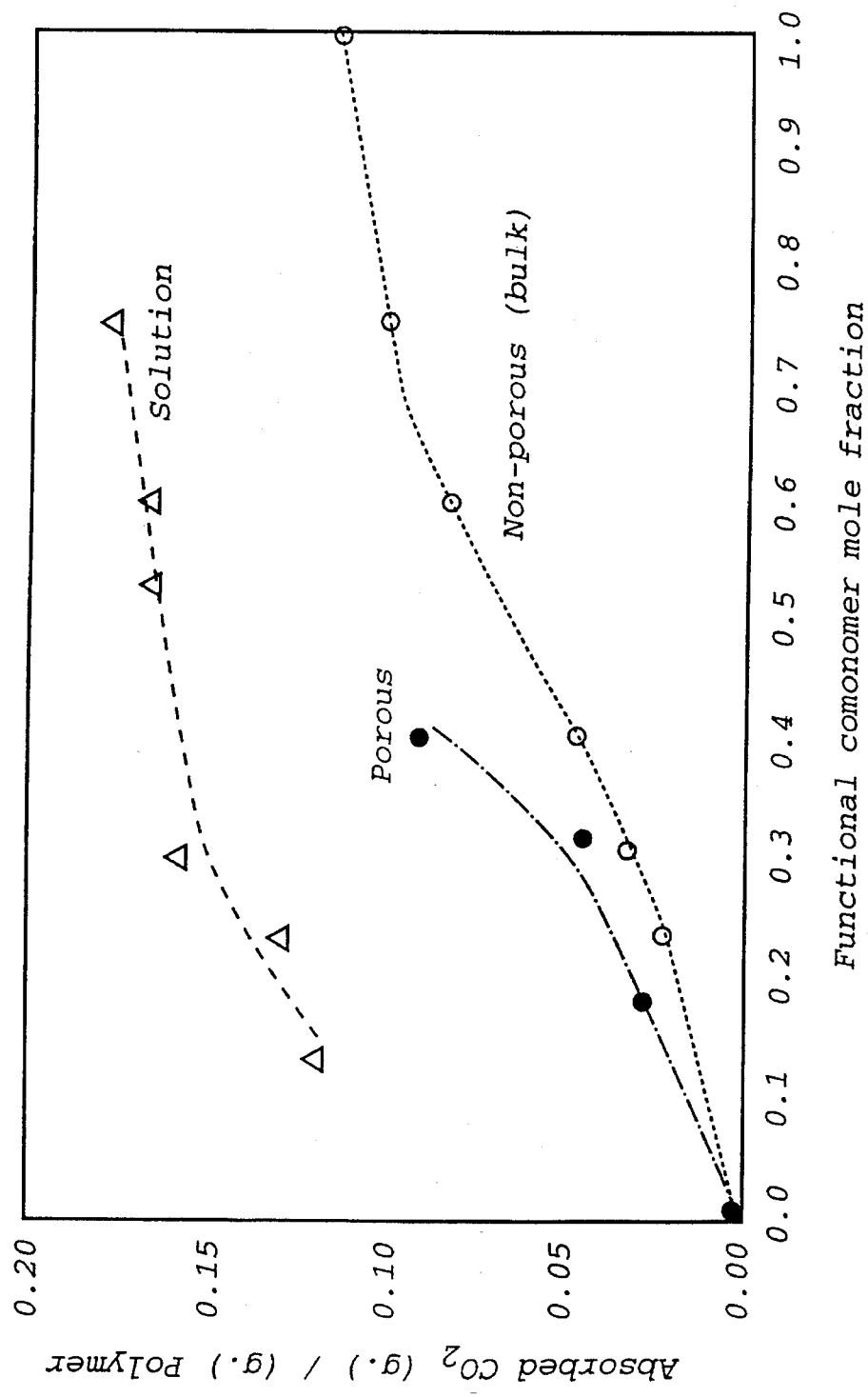
FIG. 26 is an illustration of $CO_2$ binding capacity versus amine content.

$CO_2$ binding in EDA-functional polystyrene is primarily due to the primary amine group, which fixes approximately 0.30 $CO_2$'s per nitrogen, while the secondary nitrogen only binds 0.06. Further, the linear copolymers bind more $CO_2$ when reacted in solution than in the bulk state, leading to the conclusion that the binding capacity of these polymeric sorbents is governed by the concentration of accessible amine groups. As shown in FIG. 26 this accessibility criterion for a high binding capacity becomes more striking when comparing the porous and non-porous sorbents with the same functional comonomer mole fraction. Upon exposing these products to gaseous $CO_2$ in the TGA, the $CO_2$ binding capacity for the porous beads is more than double that of the linear non porous copolymers, owing to the large BET surface area of the porous beads and thus a higher surface concentration of accessible binding sites. In fact, the TGA data showed that 41% (molar) of the total nitrogen content for the porous materials have reacted with $CO_2$, corresponding to an 80% conversion based on terminal nitrogens. Conversely, only 20% of the nitrogens of the linear nonporous copolymer participated in the binding reaction corresponding to a 40% conversion based on the same considerations. These observations suggest that the majority of the binding sites of the linear non-porous copolymers are buried in the polymer matrix.

Figure 27:
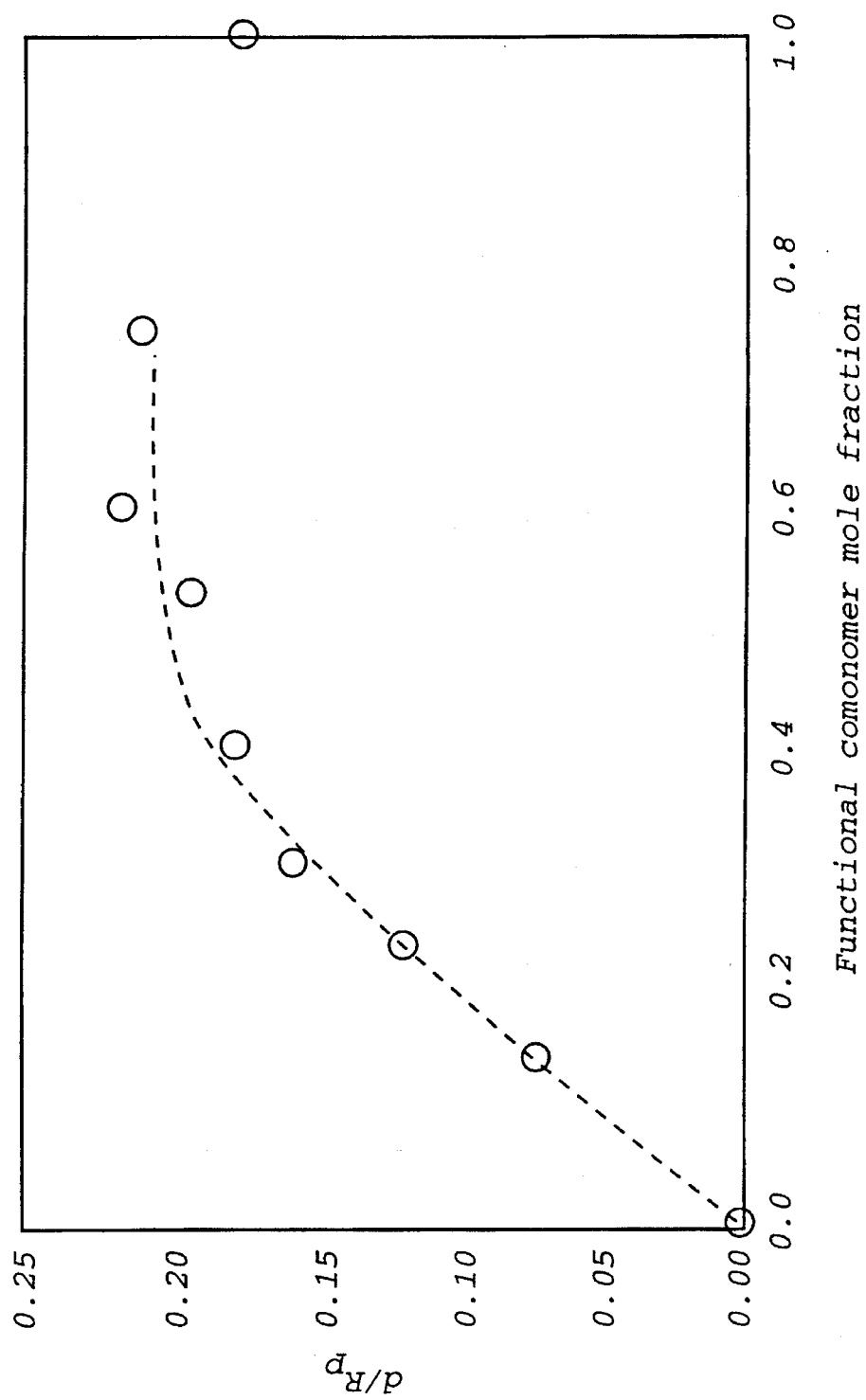
FIG. 27 is an illustration of versus $d/R_p$ amine content.

The shape of the binding capacity curves in FIG. 26 for the linear copolymers reacted with $CO_2$ in the TGA show that the binding capacity of these sorbents levels off at high functional comonomer fraction. This behavior may be attributable to variations in polymer microstructure as amine content increases, and consequently the $CO_2$ transmittance (C*D, where C is concentration and D is the diffusion coefficient). Assuming that the $CO_2$ diffuses into the polymer spheres uniformly, forming a spherical shell of $CO_2$:polymer product, one can derive the thickness of the shell formed from such quantities as the fractional weight increase (FWI) from the TGA data (at 25° C.) and the nitrogen weight fraction (N) of the polymer from elemental analysis. Assuming that the amine groups are distributed evenly through the polymer, and that 1 $CO_2$ molecule is bound by each accessible tail amine group, equation 6 is derived: (See Appendix for derivation)

$$\frac{d}{R_p} = 1 - \left[ 1 - .636 * \frac{FWI}{N} \right]^{1/3} \quad (6)$$

where d is the thickness at equilibrium of the shell that has reacted with $CO_2$ and $R_p$ is the average radius of the non-porous polymer particles. A plot of $d/R_p$ vs functional comonomer mole fraction provided in FIG. 27 highlights the onset of a facilitated transport mechanism of $CO_2$ as amine content in the polymer is increased. Maximum facilitated diffusion occurs at a functional comonomer mole fraction of 0.4. It is important to note that at about 40% functional comonomer content, the curve of $d/R_p$ vs N changes curvature, suggesting the onset of diffusional constraints, the position of which Corresponds closely to the onset of the dramatic increase in the Tg of the aminated copolymers mentioned previously. A large increase in the Tg of the polymer, while maintaining a constant operating temperature, would be accompanied by a drop in chain-segment mobility, and thus a decrease in the diffusion coefficient.

Figure 28A:
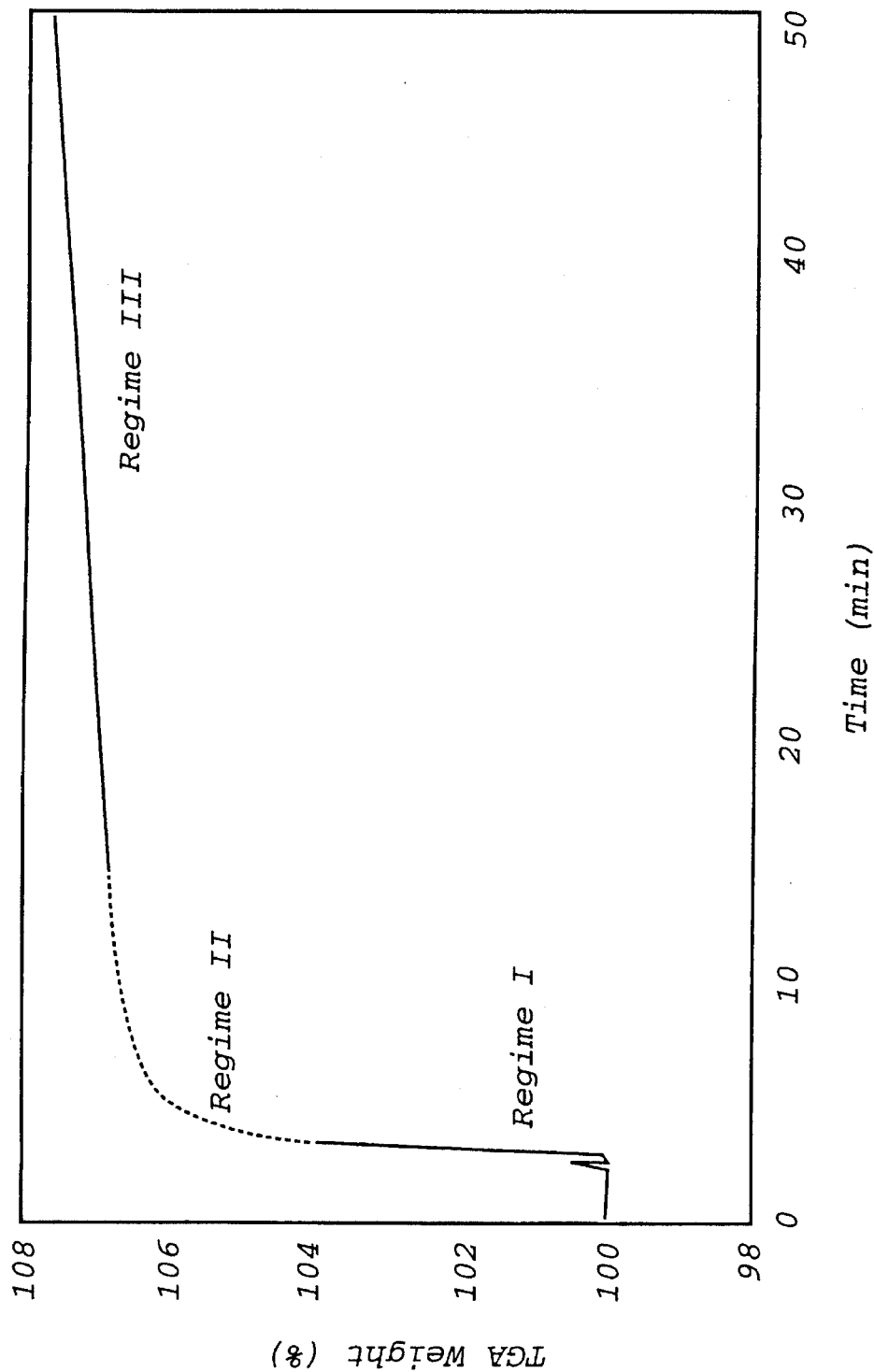
FIG. 28A is an illustration of a typical TGA binding isotherm.
Figure 28B:
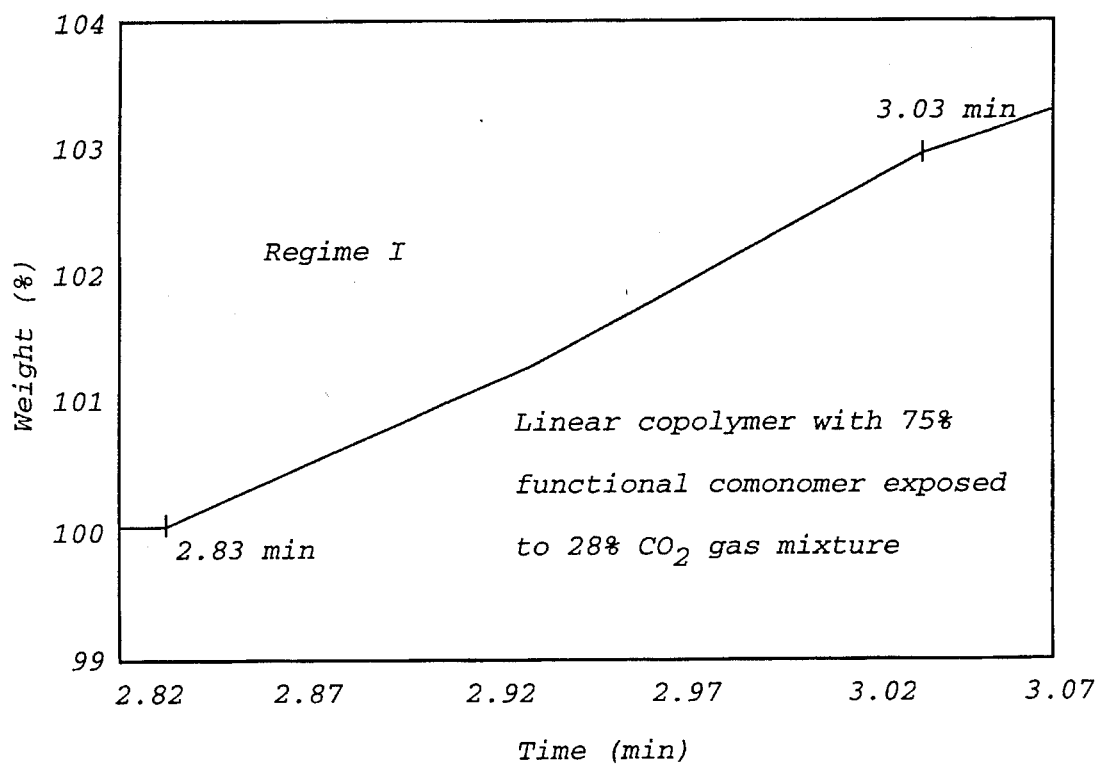
FIG. 28B is a detailed illustration of Region I of a typical TGA binding isotherm.

Observation of an apparent facilitated transport mechanism prompted examination of the kinetics of $CO_2$ reaction in more depth. The existence of three kinetic regimes, as depicted in FIGS. 28A and 28B, was postulated for a typical binding reaction monitored by TGA. First, diffusion of $CO_2$ from the bulk to the polymer surface, followed by fast reaction (regime I). Second, after sufficient time has elapsed to react all of the surface sites, further binding of $CO_2$ will proceed via diffusion through a thin film of reacted polymer to unreacted sites (regime II). Third, upon formation of a sufficiently thick shell, further binding will be governed by diffusion through a substantial spherical layer of aminopolymer:$CO_2$ product (regime III), followed by fast reaction.

Figure 29:
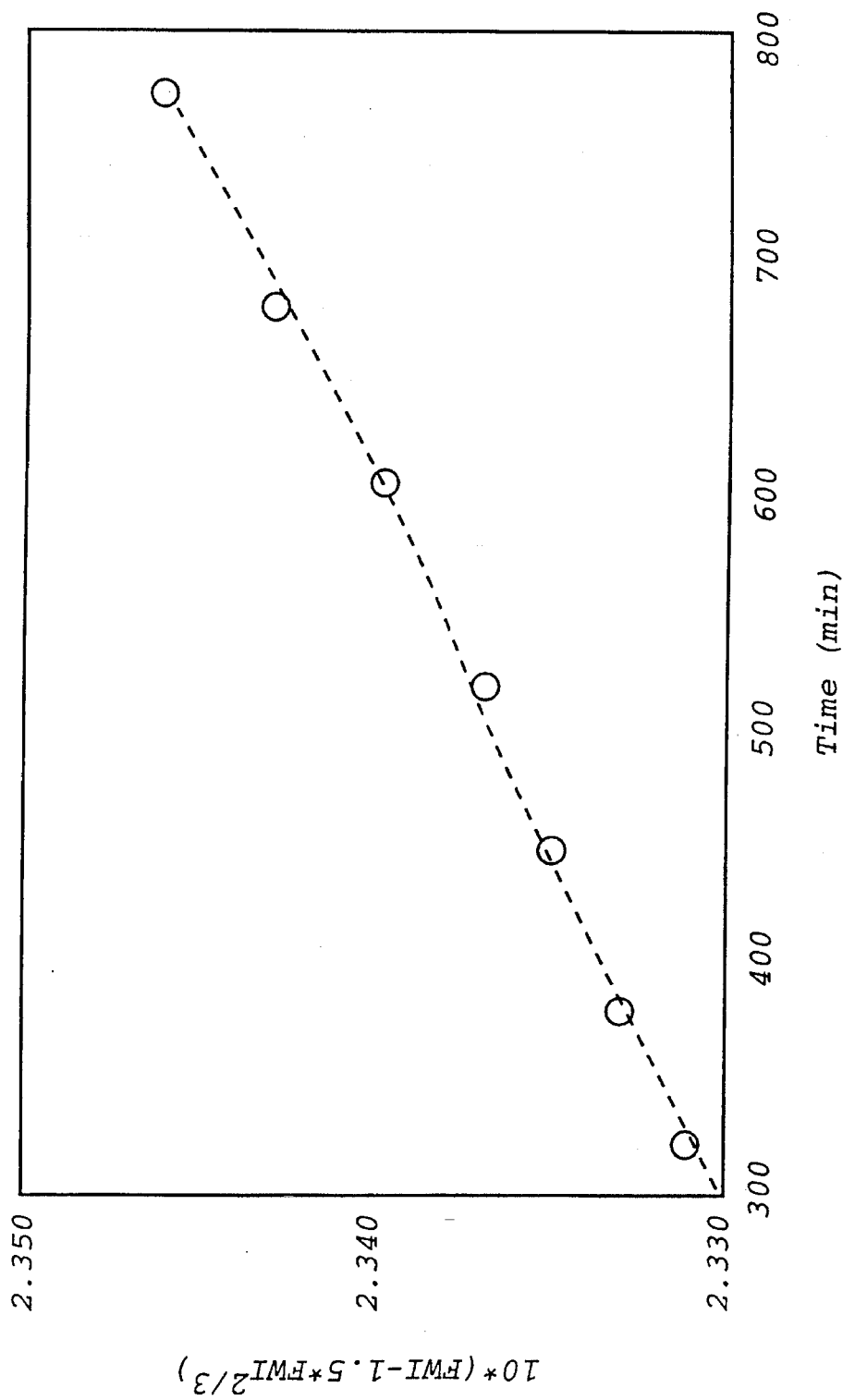
FIG. 29 is an illustration of (FWI-1.5*FWI$^{2/3}$) versus t.
Figure 30:
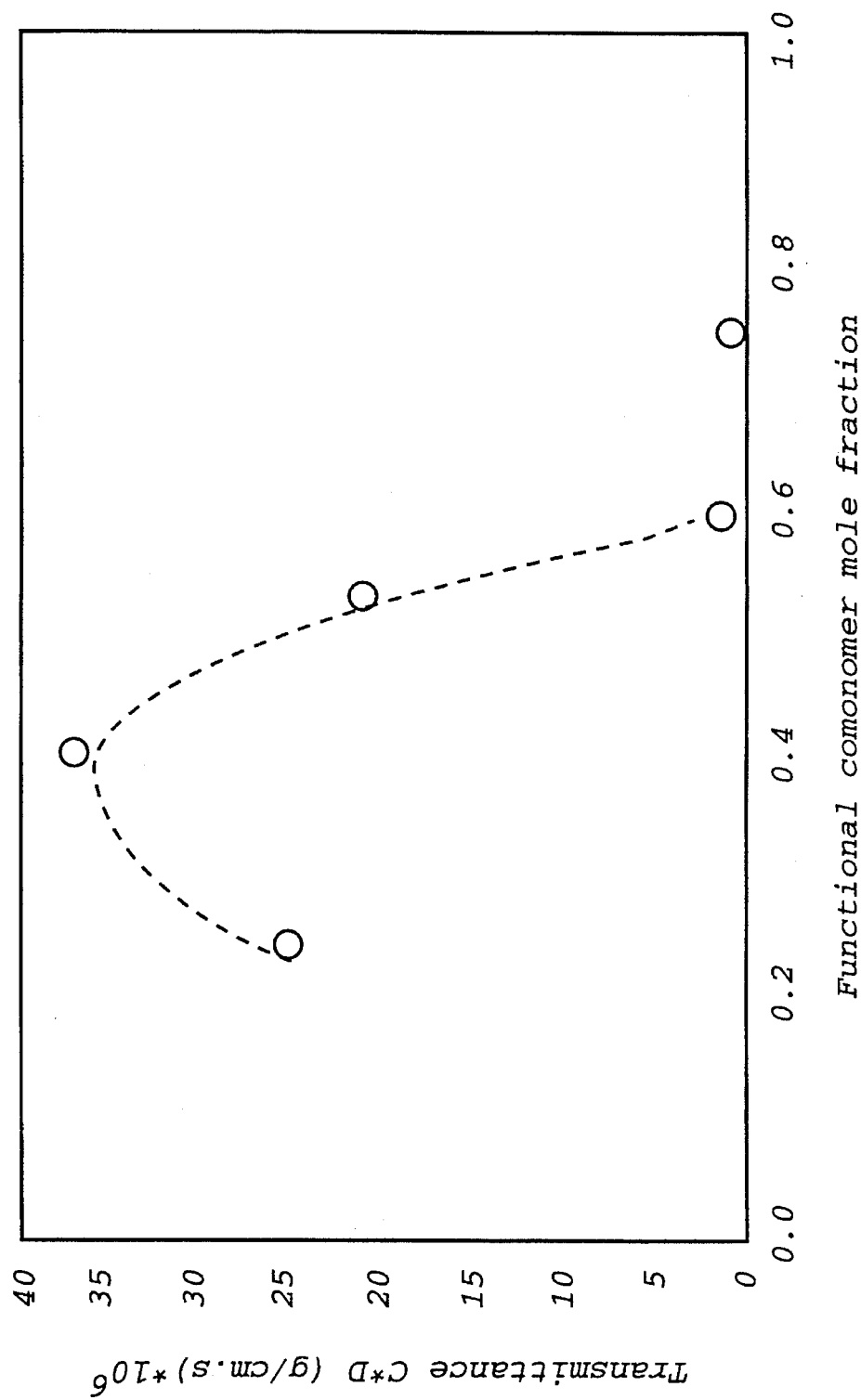
FIG. 30 is an illustration of $CO_2$ transmittance (C*D) through product layer versus amine content.

In regime III, it is postulated that the rate of $CO_2$ binding is determined by the rate of $CO_2$ diffusion through the product layer. To obtain an estimate of the diffusion coefficient of $CO_2$ through the product layer in regime III, the TGA data collected at very long times within the diffusion-controlled reaction regime were plotted using a model derived by Souchay and Pannetier, *Chemical Kinetics*, Elsevier, (1967), the disclosure of which is incorporated herein by reference:

$$(FWI)-1.5*(FWI)^{2/3}=(Cons.)*t \qquad (7)$$

which yields a straight line (see FIG. 29), the slope of which is proportional to the diffusion coefficient (see FIG. 30). At low amine loading, $CO_2$ intra-particle diffusion is enhanced by facilitated transport, whereas at higher amine contents the $CO_2$:polymer complex coat surrounding the unreacted core of the sorbent particles imparts a gradual increase in the $CO_2$ barrier properties of the reacted shell as functional comohomer content is increased from ca. 40 to 100%. It can be clearly seen that optimum facilitation occurs, as stated earlier, in the range of 0.4 functional comonomer mole fraction, coinciding with the minimum of the Tg-amine relationship for these materials. Higher amine loadings cause the diffusion coefficient to fall sharply until it is approximately equal to that of glassy polystyrene.

8. Reaction kinetics of acid gas binding.

In regime I, the reaction of acid gases such as $CO_2$, $SO_2$, $H_2S$ or $NO_x$ with the polymeric sorbents under isothermal conditions, as described earlier, lends itself to a simple mathematical treatment using a pseudo-first order kinetic model. Since the binding reactions are carried out under a steady flow of the gas being studied, it is legitimate to assume that the bulk concentration of the acid gas in the TGA furnace remains constant at all times. In this model, the total number of free amine sites $[S_o]$ capable of participating in acid gas binding is given by the number of primary amine groups present in the polymer which is given by:

$$[S_o] = m_p * \frac{N}{28} \qquad (8)$$

where $m_p$ is the mass of the unreacted polymer. At any arbitrary time of the reaction, the number of vacant sites $[S]$ is estimated from the absorption isotherm as follows:

$$[S] = [S_o] - \frac{TGA \text{ weight increase (g)}}{44 \text{ (g/mole)}} \qquad (9)$$

Figure 31:
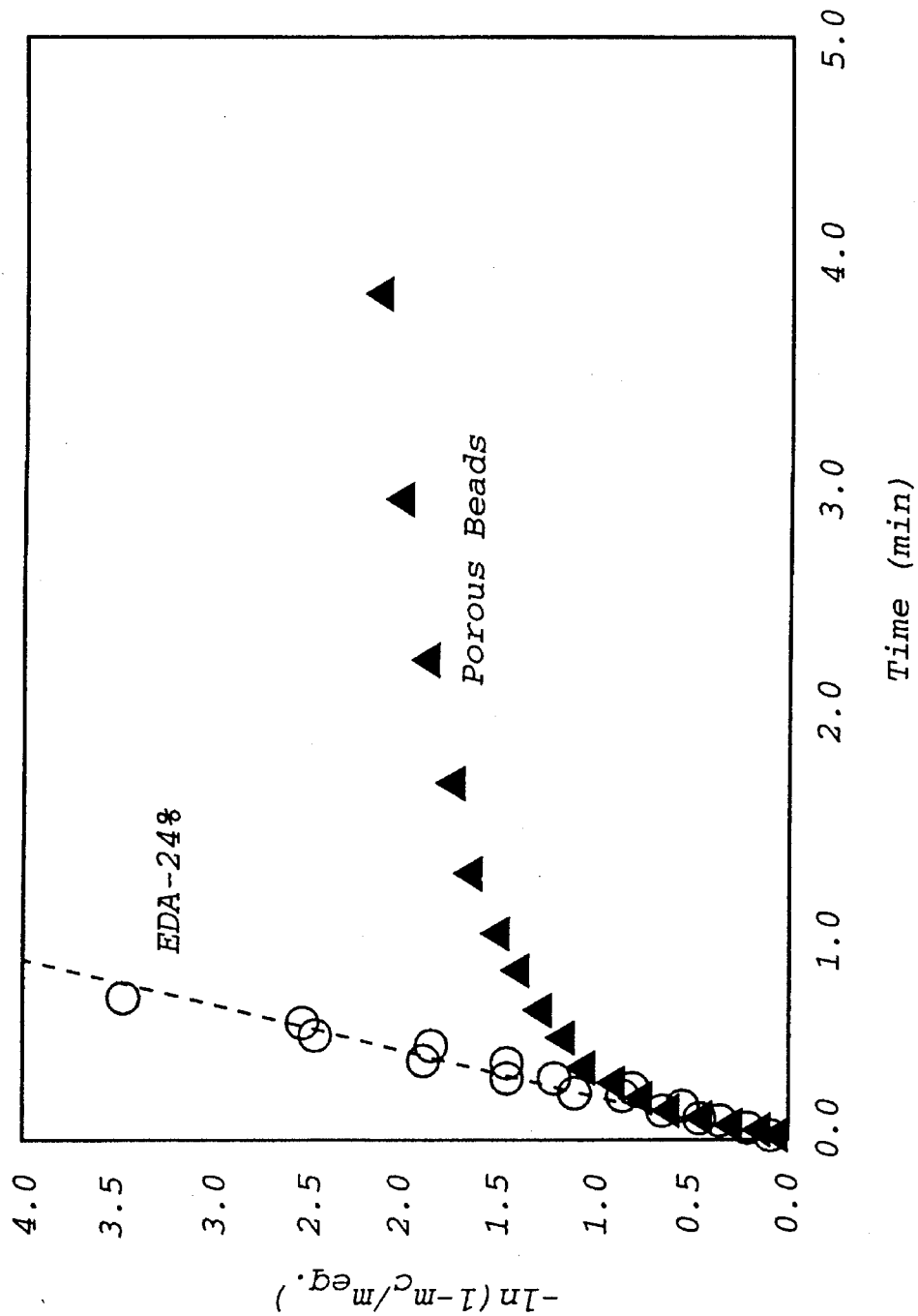
FIG. 31 is a pseudo-first order kinetic model plot of TGA data.

Under a constant acid gas concentration, integration of the first order reaction model leads to:

$$-\ln \frac{[S]}{[S_o]} = kt \qquad (10)$$

where k is a lumped rate constant. Substituting the appropriate masses of bound $CO_2$, $SO_2$ or NO for $[S]$ and $[S_o]$ yields the more convenient expression:

$$-\ln \left( 1 - \frac{.636}{N} * \frac{m_c}{m_p} \right) = kt \qquad (11)$$

where $m_c$ is the mass of bound substrate at time t. At the early stages of the reaction, FIG. 31 suggests that the binding process follows pseudo-first order kinetics. At higher amine contents however, diffusional limitations become rate-limiting and thus the gradual slow-down in the reaction rate results in a deviation from linearity. Similar conclusions are also applicable to the porous materials although in this instance pore and intra-particle diffusion restrictions are the rate determining factor at longer times.

Figure 32:
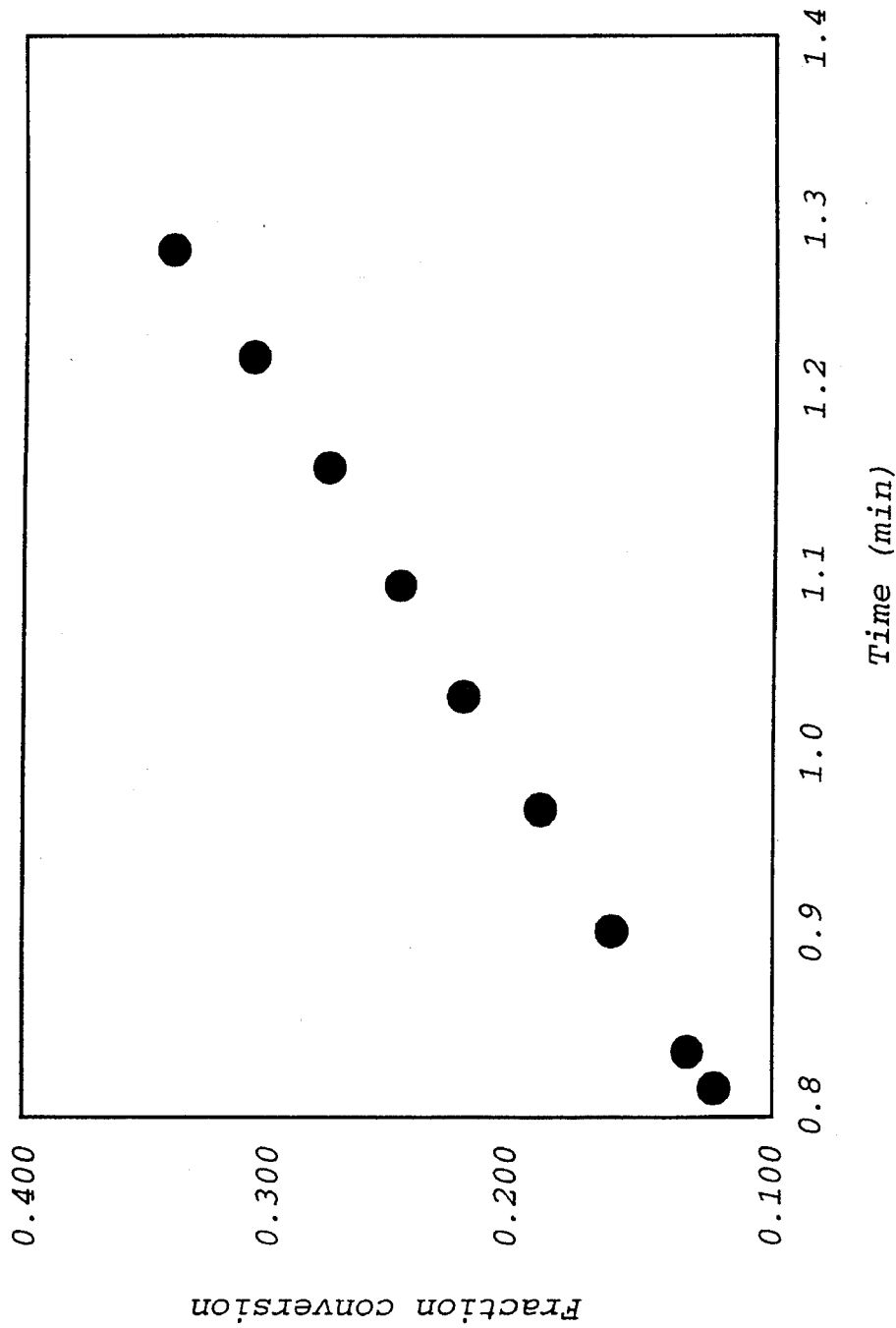
FIG. 32 is an illustration of fraction conversion versus t.
Figure 33:
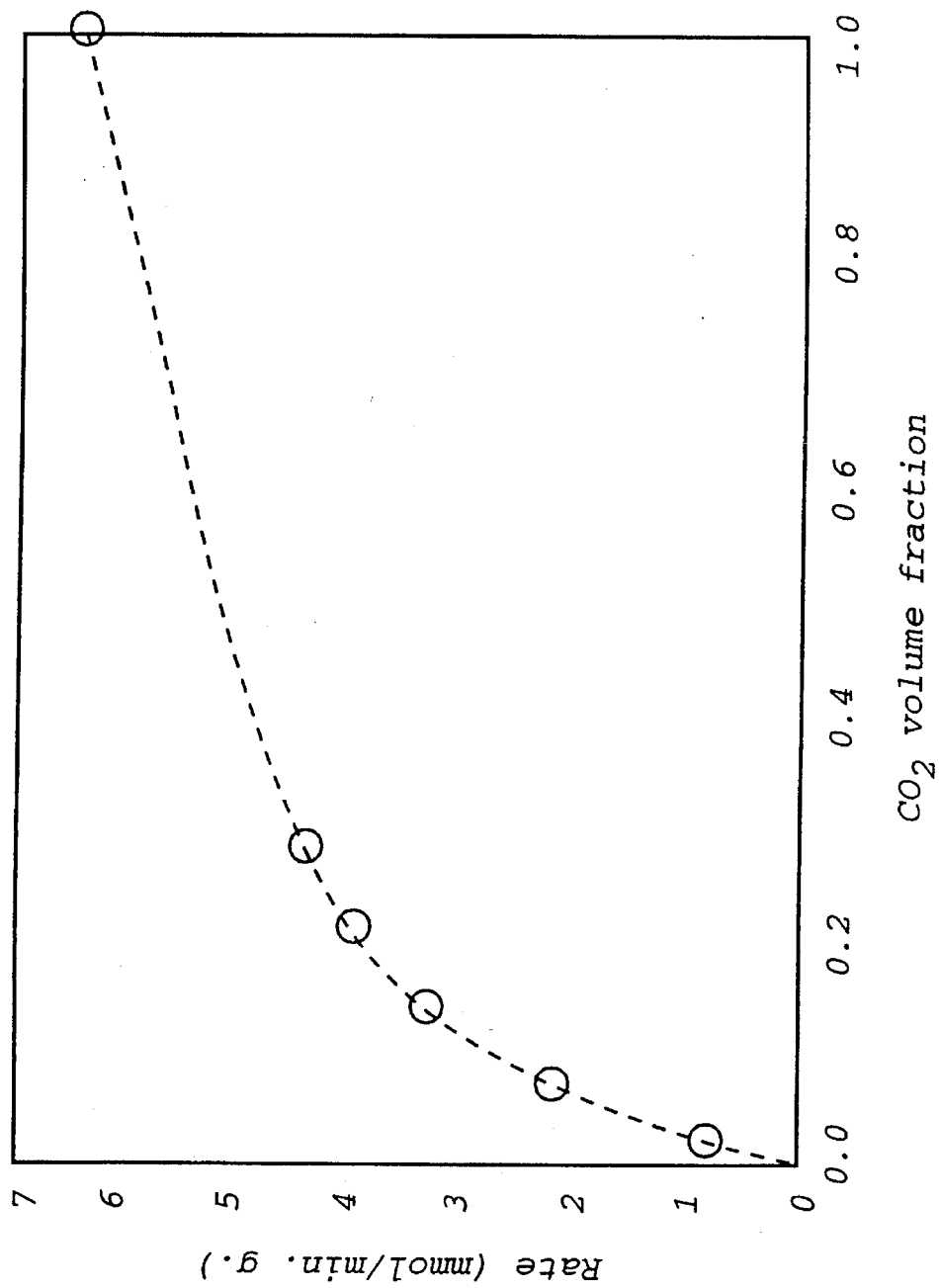
FIG. 33 is an illustration of rate of $CO_2$ binding versus $CO_2$ concentration in the purge.

The kinetic analysis of regime I would be incomplete without a study of the mass transport effects through the stagnant gas film surrounding the sorbent particle. If the reaction rate were governed by the diffusion rate of $CO_2$ through the gas film, the progress of the reaction would follow the expression:

$$\frac{t}{t_{eq}} = f \qquad (12)$$

where f is the fraction conversion, t is time and:

$$t_{eq} = \frac{const.}{k_g * [C_o]} \qquad (13)$$

is the time required for complete reaction and $k_g$, is the mass transfer coefficient of $CO_2$ through the gas film. Hence, a plot of the fraction conversion as a function of time should yield a straight line whose slope is proportional to $k_g$ (FIG. 32). It is expected that this model would also fit the experimental data because the mathematical expressions describing the kinetically controlled and the mass transport controlled models are identical in form at low conversion. In order to unequivocally find out whether the binding reactions in regime I are mass transfer or kinetically controlled, the concentration of $CO_2$ in the gas purge was varied in order to determine its effect on the rate of $CO_2$ binding. If regime I were mass transport limited, the rate of $CO_2$ binding would be proportional to the $CO_2$ concentration in the purge, that is:

$$\text{Rate}=(Const.)*k_g*[CO_2] \qquad (14)$$

assuming that $k_g$ is not a function of $CO_2$ concentration. A plot of the rate of $CO_2$ binding versus $CO_2$ concentration in FIG. 33 does not yield a straight line which indicates that the rate of $CO_2$ binding in regime I is not limited by mass transport of $CO_2$ through the gas stagnant film. It is therefore concluded that regime I is kinetically controlled.

Crosslinked amino-functional polymers in the form of porous beads (40 m²/g) were found to exhibit affinity and selectivity for the adsorption of acidic gaseous substrates. Their binding capacity was found to be superior to their non-porous (below 30 m²/g) linear counterparts owing to a much larger surface area and thus a greater concentration of accessible surface binding sites per gram of polymer. The reaction kinetics were found to follow a pseudo-first order process at the initial stages of the reactions and become mass transport limited at longer times. The dramatic changes in the $CO_2$ transmittance (C*D) through the reacted polymer coat surrounding the sorbent particles suggest the onset of a $CO_2$-transport facilitation mechanism at low amine loading.

As amine content is increased above the range of 40% comonomer mole fraction, the diffusion coefficient of $CO_2$ through the product layer decreases sharply indicating the formation of a material with high $CO_2$-barrier properties.

$CO_2$ binds readily onto the amine sites when exposing these materials to ambient air. Reversibility of the absorption-desorption processes for $CO_2$, $SO_2$, $H_2S$ and $NO$ occur in a clean and complete fashion under mild conditions thus making this class of materials potential environmentally-friendly sorbents for acid gas pollutants.

9. Acid gas removal

As shown by the above studies, acid gases including $CO_2$, $NO_x$, $SO_2$ and $H_2S$ can be removed by linear aminated polymers, branched aminated polymers and preferably crosslinked, microporous aminated polymers simply by contacting a gas stream or system containing one or more acid gases to be removed with such aminated polymers in solid form. The acid gases are preferably complexed or reacted with the aminated polymers at temperatures well below the temperature at which the products of the reaction of aminated polymers and acid gases thermally dissociate or debond to produce the free acid gas and a regenerated aminated polymer.

Figure 34A:
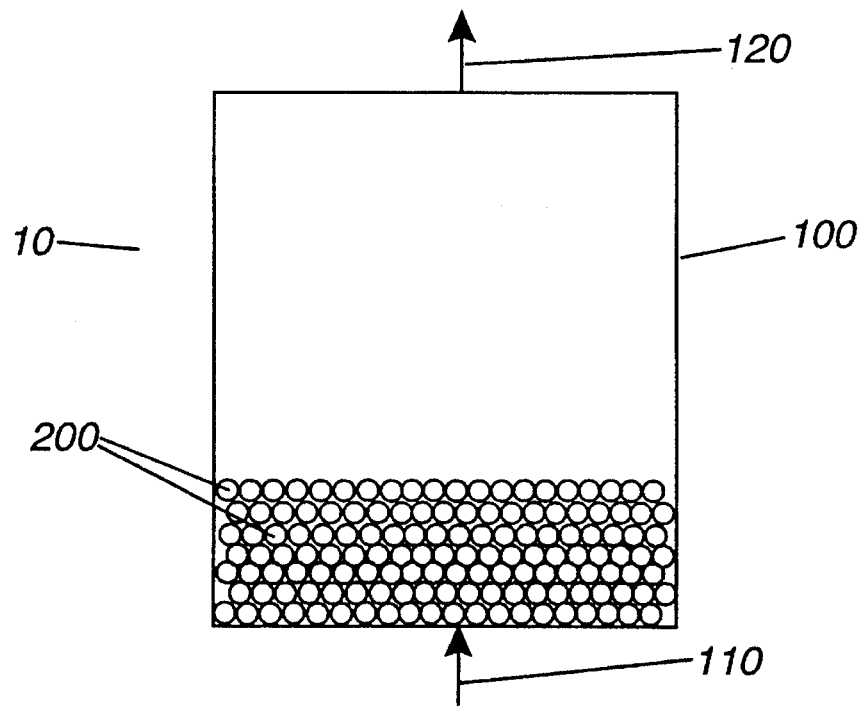
FIG. 34A is an illustration of an operational unit for acid gas removal including a sorbent system in the form of fixed bed.
Figure 34B:
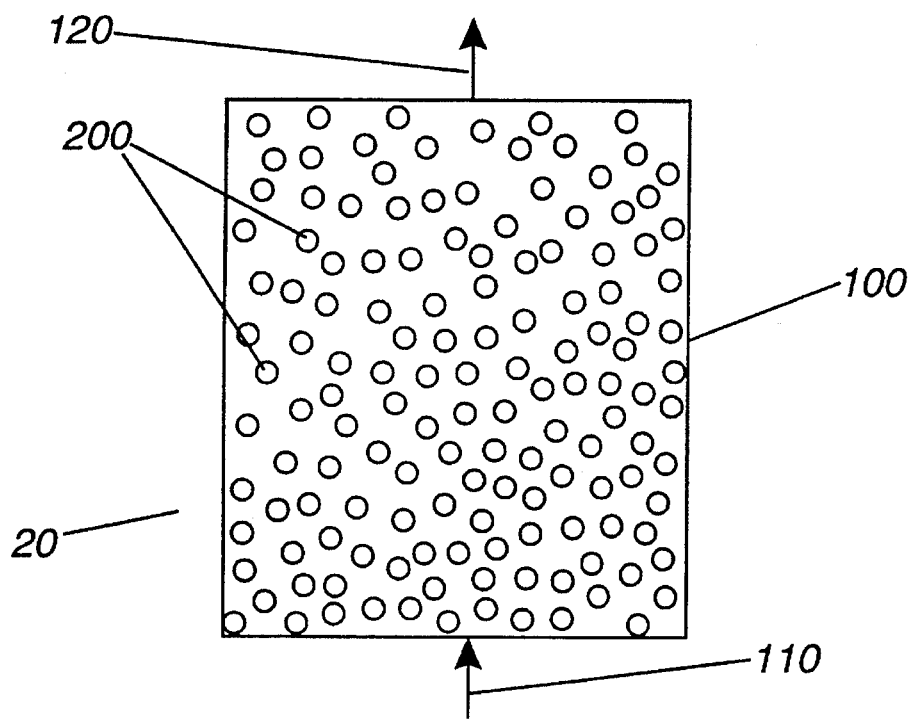
FIG. 34B is an illustration of an operational unit for acid gas removal including a sorbent system in the form of fluidized bed.

Preferably, the aminated polymer is in the form of microporous beads. Operational units for effecting removal of at least a portion of an acid gas from a gas stream containing the acid gas are illustrated in FIGS. 34A and 34B. Generally, operation units 10 and 20 comprise a vessel 100. Vessel 100 comprises an inlet means 110 for receiving the gas stream and an outlet means 120 for releasing the gas stream after removal of the portion of the acid gas therefrom. Operational units 10 and 20 also comprise a sorbent system comprising an aminated polymer 200 contained within vessel 100 in a manner that the gas stream contacts the sorbent system to remove the acid gas from the gas stream by reactive complexing of the acid gas by the amine groups of the aminated polymer.

As shown in FIG. 34A the sorbent system can be contained in vessel 100 as a fixed bed. Preferably, the sorbent system is fluidized as shown in FIG. 34B.

Figure 35:
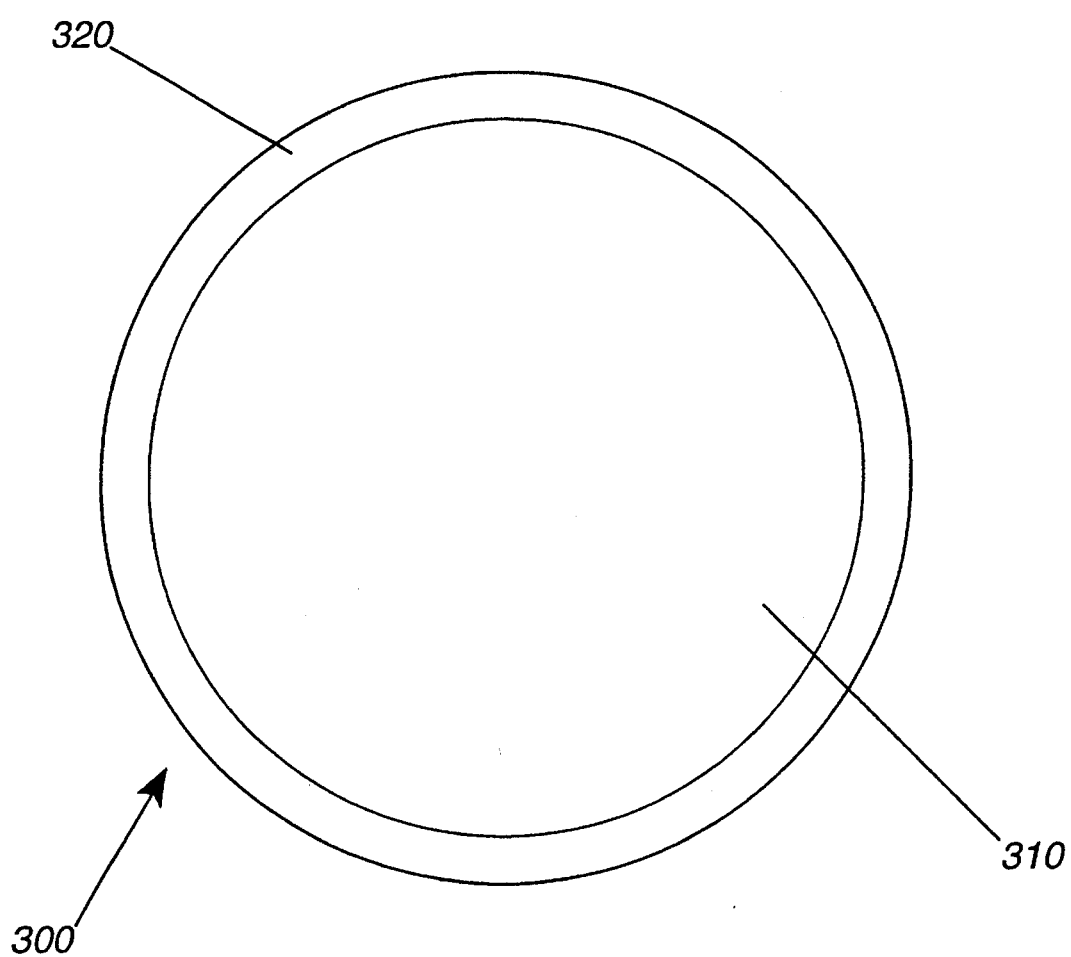
FIG. 35 is an illustration of an aminated polymer coded substrate for use in acid gas removal.

Preferably, the present method of acid gas removal is practiced in an operational unit including a fixed bed or a fluidized bed of aminated polymer. As shown in FIG. 35, an aminated-polymer coated substrate 300 can also be used. Preferably the substrate is in the form of a sphere 310 having an aminated polymer film 320 on the exterior thereof. Preferably the spherical substrate 310 is a glass bead.

Although the invention has been described in detail for purposes of illustration, it is to be understood that such detail is solely for that purpose and that variations can be made therein by those skilled in the art without departing from the spirit and scope of the invention except as it may be limited by the claims.

Appendix

The fractional weight increase (FWI) due to $CO_2$ reaction given by:

$$FWI = \frac{m_c}{m_p}$$

where: $m_c$ increase, and $m_p$=weight of unexposed polymer. The weight of the unexposed particle is given by:

$$m_p = \frac{4}{3} * 3.14 * R_p^3 * \text{density}$$

where density refers to the density of the unexposed polymer. The weight increase of the particle due to $CO_2$ binding by tail amino-groups is:

$$m_c = \left[ \frac{4}{3} * 3.14 * (R_p^3) - \frac{4}{3} * 3.14 * (R_p - d)^3 \right] * \text{density} * N \frac{44}{28}$$

The fractional weight increase due to reaction with $CO_2$ is:

$$FWI = \frac{m_c}{m_p} = \left[ 1 - \left( 1 - \frac{d}{R_p} \right)^3 \right] * \frac{11}{7} * N$$

Rearranging this expression yields:

$$\frac{d}{R_p} = 1 - \left[ 1 - .636 * \frac{FWI}{N} \right]^{1/3}$$

What is claimed is:

1. A method or removing an acid gas from a gas system, comprising the step of:
    (a) exposing an acid gas sorbent comprising an aminated polymer to the gas system under conditions suitable to reactively complex the acid gas with said aminated polymer, said aminated polymer having a molecular weight greater than or equal to approximately 5000, said aminated polymer comprising covalently attached amino functional groups suitable to complex the acid gas.

2. The method of removing an acid gas from a gas system of claim 1 further comprising the step of:
    (b) heating said complexed aminated polymer to a temperature sufficiently high to debond the acid gas.

3. The method of removing an acid gas of claim 2 wherein steps (a) and (b) are repeated.

4. The method of removing an acid gas of claim 1 wherein said at least one acid gas is complexed to pendant amine groups of said aminated polymer.

5. The method of removing an acid gas of claim 4 wherein said pendant amine groups are selected from the group consisting of diamines and triamines.

6. The method of removing an acid gas of claim 4 wherein said pendant amine groups are selected from the group consisting of primary and secondary amines.

7. The method of removing an acid gas of claim 5 wherein said amines groups are selected from the group consisting of primary and secondary amines.

8. The method of removing an acid gas of claim 1 wherein said aminated polymer comprises a copolymer of styrene and an amine functional vinylbenzyl moiety.

9. The method of removing an acid gas of claim 1 wherein said aminated polymer comprises a microporous, crosslinked polymer.

10. The method of removing an acid gas of claim 9 wherein said microporous, crosslinked polymer comprises a copolymer of divinylbenzene and an aminated vinylbenzyl moiety.

11. The method of removing an acid gas of claim 10 wherein said microporous, crosslinked polymer comprises a copolymer of divinylbenzene, styrene and an aminated vinylbenzyl moiety.

* * * * *